US006967773B2

(12) United States Patent
Sukekawa

(10) Patent No.: US 6,967,773 B2
(45) Date of Patent: Nov. 22, 2005

(54) MICROSCOPE HAVING AN ILLUMINATION OPTICAL SYSTEM WHICH IS INTEGRATED WITH THE MICROSCOPE BASE WHICH REDUCES HEAT CONDUCTION FROM THE MICROSCOPE BASE TO THE MICROSCOPE FRAME

(75) Inventor: Minoru Sukekawa, Ina (JP)

(73) Assignee: Olympus Optical Co., Ltd., Tokyo (JP)

( * ) Notice: Subject to any disclaimer, the term of this patent is extended or adjusted under 35 U.S.C. 154(b) by 39 days.

(21) Appl. No.: 11/025,382

(22) Filed: Dec. 29, 2004

(65) Prior Publication Data

US 2005/0117205 A1 Jun. 2, 2005

Related U.S. Application Data

(62) Division of application No. 10/759,763, filed on Jan. 16, 2004, now Pat. No. 6,853,481, which is a division of application No. 09/595,945, filed on Jun. 16, 2000, now Pat. No. 6,693,741.

(30) Foreign Application Priority Data

Jun. 21, 1999 (JP) ................................ 11-174087
Mar. 17, 2000 (JP) ............................ 2000-077141

(51) Int. Cl.[7] ............................................. G02B 21/00
(52) U.S. Cl. ....................... 359/368; 359/383; 359/390
(58) Field of Search ................................ 359/368, 379, 359/380, 382, 383, 385, 390, 392; 248/346.5

(56) References Cited

U.S. PATENT DOCUMENTS

| | | | |
|---|---|---|---|
| 1,960,554 | A | 5/1934 | Siedentopt |
| 3,576,438 | A | 4/1971 | Pease |
| 4,619,503 | A | 10/1986 | Reinheimer et al. |
| 4,733,954 | A | 3/1988 | Reinheimer et al. |
| 5,585,964 | A | 12/1996 | Schalz |
| 5,703,715 | A | 12/1997 | Gaul |
| 5,757,542 | A | 5/1998 | Brock |

FOREIGN PATENT DOCUMENTS

| | | | |
|---|---|---|---|
| JP | 55-24566 | A | 6/1980 |
| JP | 1-183423 | A | 7/1989 |
| JP | 9-120030 | A | 5/1997 |
| JP | 10-142508 | A | 5/1998 |

*Primary Examiner*—Mark A. Robinson
(74) *Attorney, Agent, or Firm*—Frishauf, Holtz, Goodman & Chick, P.C.

(57) ABSTRACT

A microscope is provided which includes a frame which supports a stage that is adapted to have a specimen placed thereon, an arm provided on the frame to support an objective lens, an observation optical system provided on the arm, and an illumination optical system which includes a light source for illuminating the specimen and which is integrated with the frame. A fastening mechanism fastens the arm and the frame together via at least one spacer, which is provided between the arm and the frame. The spacer has a coefficient of thermal expansion that is different from the coefficient of thermal expansion of the arm. When a temperature of the frame rises due to operation of the light source, the objective lens is moved toward the stage due to the difference in coefficients of thermal expansion between the spacer and the arm.

8 Claims, 15 Drawing Sheets

MICROSCOPE HAVING AN ILLUMINATION OPTICAL SYSTEM WHICH IS INTEGRATED WITH THE MICROSCOPE BASE WHICH REDUCES HEAT CONDUCTION FROM THE MICROSCOPE BASE TO THE MICROSCOPE FRAME

CROSS-REFERENCE TO RELATED APPLICATIONS

The present application is a Divisional of U.S. application Ser. No. 10/759,763, filed Jan. 16, 2004 now U.S. Pat. No. 6,853,481 which is a Divisional of U.S. application Ser. No. 09/595,945 filed Jun. 16, 2000 (now U.S. Pat. No. 6,693, 741, issued Feb. 17, 2004), which is based upon and claims the benefit of priority from the prior Japanese Patent Applications No. 11-174087, filed Jun. 21, 1999; and No. 2000-077141, filed Mar. 17, 2000, the entire contents of which are incorporated herein by reference.

BACKGROUND OF THE INVENTION

The present invention relates to a microscope that is protected against thermal expansion due to heat from an illumination optical system.

During observation under a microscope, an observer takes a comfortable position, with his or her arms placed on a desk or takes notes on a desk. In light of this, a microscope is designed such that its base is narrow to make as large as possible the remaining area of a desk on which the microscope is placed.

Because of this, many recent microscopes contain a power supply for turning on a lamp at their back, as shown in FIGS. 1 and 2.

In a transmitted-light type microscope in FIG. 1, an arm 3 is provided in U-shaped formation through a frame 2 on a base 1. A stage 5 is slidably installed on the frame 2 to mount a specimen 4. An objective lens 7 is attached through a revolver 6 to the arm 3. The microscope also has an observation optical system 8. A lamp housing 11 with a lamp 9 and a collector lens 10 which are intended to give transmitted illumination to the specimen 4 is disposed on the base 1. The frame 2 contains a power supply 12 for turning on the lamp 9.

In a reflected-light type microscope in FIG. 2, on the other hand, a reflected-light optical system 13 and the lamp housing 11 are provided on the arm 3. The frame 2 also contains the power supply 12 for turning on the lamp 9.

When a specimen is observed under such a microscope as shown in FIG. 1 or FIG. 2, heat generated from the lamp 9 is conducted to the base 1 and the frame 2, thereby expanding the microscope, so that the distance between the stage 5 bearing the specimen 4 and the objective lens 7 changes by a few micrometers. This change greatly affects the excessively narrow focal depth range of the microscope, resulting in undesirable movement of an already adjusted focal point.

Illuminating observation using a microscope is roughly classified into two types, i.e., an observation under transmitted illumination and an observation under reflected illumination. For the observation under transmitted-illumination, a lens tube is attached directly to the arm, or an intermediate lens tube, such as a magnification changer or an imager, is provided between the arm and the lens tube.

For the observation under reflected illumination, a reflected-light floodlight tube, containing a reflected-light optical system, is attached to the arm. In this case, the reflected-light floodlight tube must have not only an optical system but also sufficient space to allow a polarizing plate needed for polarization observation to be removable. Accordingly, a reflected-light floodlight tube is more spacious in the direction of the optical axis than an intermediate tube, such as a magnification changer or an imager. For optical performance reasons, the distance between the objective-lens and the lens tube is limited. A thicker microscope arm is more rigid. However, because making the microscope arm thicker affects the thickness of the reflected-light floodlight tube, it is not feasible to excessively thicken a microscope arm.

According to Jpn. Pat. Appln. KOKAI Publication No. 9-120030, a focal point shift in the direction of the optical axis due to thermal expansion of a microscope is reduced by disposing two rods combined together which differ in coefficient of thermal expansion between the rack and stage of the microscope so that the rods expand due to heat in opposite directions.

According to Jpn. Pat. Appln. KOKAI Publication No. 10-142508, a reflected-light floodlight tube is installed near the border between the frame and arm of a microscope, and a fastening member is provided on top of the frame to increase the rigidity of the arm.

According to Jpn. UM Appln. KOKOKU Publication No. 55-24566, a thin arm with a replaceable arm, which assembly is equivalent to a conventional microscope attachment, is integrated with the arm to make the end of the arm stronger.

According to Jpn. Pat. Appln. KOKAI Publication No. 9-120030 also, the rack and stage are connected together through the two rods. However, the stage is considerably fragile because of a long distance between the rack and stage. Accordingly, if a load or a force is applied to the stage, the image of a specimen greatly moves.

According to Jpn. Pat. Appln. KOKAI Publication No. 10-142508, a microscope using a large intermediate lens tube, such as a reflected-light floodlight tube, is made more rigid. Because the thickness of the arm is limited so that if no intermediate lens tube is used, optical performance is attained which is required when an intermediate lens tube is incorporated, the arm disclosed in the publication is thin and poorly rigid. More lens tubes have been used in combination with an intermediate lens tube, with a heavy television camera placed on them. In such uses, a poorly rigid arm poses a problem.

According to Jpn. UM Appln. KOKOKU Publication No. 55-24566, an arm connection is of a dovetail type. The dovetailed connection is short and unsuitable for an arm which undergoes a large moment. The connection is not resistant to a force parallel to the dovetailed contact surface.

Jpn. Pat. Appln. KOKAI Publication No. 10-142508 and Jpn. UM Appln. KOKOKU Publication No. 55-24566 disclose no corrective action against thermal deformation. What is worse, according to these publications, the thickness of an observable specimen is limited; that is, only a specimen with a thickness equivalent to the travel of a stage can be observed.

As described below, in a microscope with a power supply incorporated at the back of the microscope body, thermal expansion of a metal plate securing the power supply adversely affects the microscope body, so that the focal point shifts.

FIG. 4 shows the structure of a microscope with a power supply and a metal plate incorporated at the back of the microscope body.

A base 100 has a support 101 and an arm 102 combined together. In the rear of the base 100, a lamp housing 103 is provided, in which a lamp 104 and a collector lens 105 are installed to illuminate a specimen 4. A diffusing plate 106, a field stop 107, and a mirror 108 are provided in the base 100, which is in the optical path for illumination light emitted from the lamp housing 103. A window lens 109 is disposed in the optical path through which illumination light reflected upward at the mirror 108 passes. The window lens 109 concentrates illumination light on the specimen 4.

The support 101 has a stage guide 110 which can move up and down. The stage guide 110, which mounts the specimen 4, is lifted or lowered by turning an aiming handle 111, installed on the base 100. That is, the aiming handle 111 is connected with a pinion gear 112, which is engaged with a planetary gear 113. Because the planetary gear 113 is engaged with a rack 114 installed on the stage guide 110, using screws, rotation of the aiming handle 111 is transmitted from the pinion gear 112 through the planetary gear 113 to the rack 114, thereby moving the stage guide 110 up and down.

At its bottom, the arm 102 is fitted with an objective lens 116 through a revolver 115. A lens tube 117 is installed on top of the arm 102.

The support 101 contains a power supply 118 for turning on the lamp 104.

In a microscope incorporating such a power supply 118 at its back (support 101), the power supply 118 is secured to come in extensive contact with a metal plate 119, that is, a good conductor of heat, thereby absorbing and dissipating heat generated from the power supply 118, and the metal plate is secured to the support 101 of the microscope body, using a plurality of fasteners, such as screws, as shown in FIG. 5, a top view of the microscope, and FIG. 6, a rear view thereof. To shut off electrical noise from the power supply 118, the metal plate 119 is desirably made of metal.

Heat generated from the power supply 118 causes the temperature of the metal plate 119 to rise, so that the plate expands due to heat. Accordingly, deformation occurs due to heat from the metal plate 119, as shown by the arrow in FIG. 6. The deformation adversely affects the microscope body, thereby moving an adjusted focal point.

Jpn. Registered Design Publication No. 922010 discloses a Y type microscope intended to increase the remaining area of a desk on which the microscope is placed. In the microscope, the power supply is secured to a W-shaped metal plate 121 so that the power supply comes in extensive contact with the plate, and the metal plate 121 is fastened to the back of the W-shaped microscope body, using a plurality of fastening members, e.g., screws 123, as shown in FIG. 7.

However, it is difficult to tap the microscope body and install the screws in the same direction to fasten the metal plate 121 to the back of the Y type microscope body, using the plurality of screws 123. Moreover, the number of machining and assembly steps increases, resulting in a higher manufacturing cost.

BRIEF SUMMARY OF THE INVENTION

Accordingly, it is an object of the present invention to provide a microscope which reduces an image blur caused by microscope body deformation due to heat, thereby obtaining a good image.

It is another object of the present invention to provide a microscope which reduces an image blur caused by deformation of a metal plate for securing a power supply to a microscope body due to heat, thereby obtaining a good image.

It is still another object of the present invention to provide a microscope which reduces an image blur due to thermal deformation at a low cost without making a stage fragile or deteriorating castability and machinability.

According to one aspect of the present invention, there is provided a microscope comprising: a base; a frame which is provided on the base and supports a stage for mounting a specimen; an arm which is provided on the frame and supports an objective lens; an illumination optical system which is provided on the base and illuminates the specimen; and a contact area adjusting member which diminishes the contact area between the base and the frame, thereby reducing heat conduction from the base to the frame.

According to another aspect of the present invention, there is provided a microscope comprising: a base; a frame which is provided on the base and supports a stage for mounting a specimen; an arm which is provided on the frame and supports an objective lens; an illumination optical system which is provided on the arm and illuminates the specimen; and a contact area adjusting member which diminishes the contact area between the arm and the frame, thereby reducing heat conduction from the arm to the frame.

According to still another aspect of the present invention, there is provided a microscope comprising: a microscope body; a light source for illuminating a specimen; a power supply for turning on the light; and a metal plate to which the power supply is attached, wherein the metal plate has a resilient tab, which is secured to the microscope body using a fixture member.

According to still another aspect of the present invention, there is provided a microscope comprising: a base; a frame which is provided on the base and supports a stage for mounting a specimen; an arm which is provided on the frame and supports an objective lens; a fastening member which fastens the frame and the arm together; and an illumination optical system for illuminating the specimen, wherein the frame has a lower coefficient of thermal expansion than the arm, and upward displacement of the objective lens due to thermal elongation of the arm is canceled by downward displacement of the objective lens due to bending of the arm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, embodiments of the present invention will be explained.

[First Embodiment]

The first embodiment of the present invention is described below with reference to the drawings.

Figure 8:
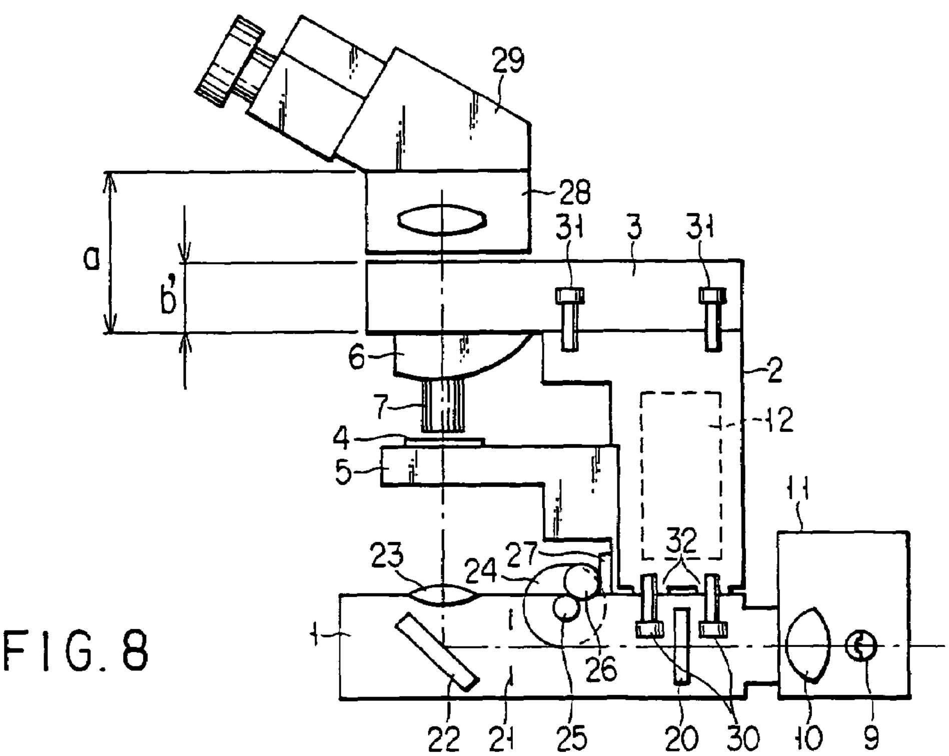
FIG. 8 shows the structure of a transmitted-light type microscope according to a first embodiment of the present invention.
Figure 9:
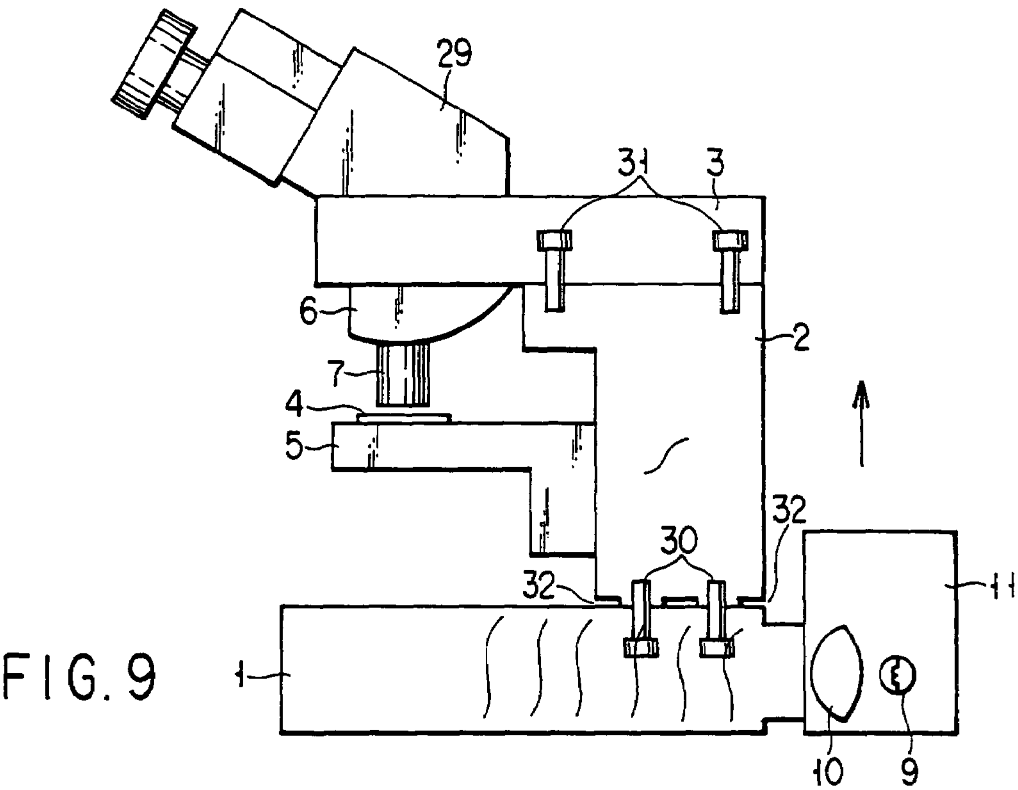
FIG. 9 illustrates a reduction in the amount of heat which is conducted from the lamp of the transmitted-light type microscope through its base to its frame.

FIG. 8 shows the structure of a transmitted-light type microscope. In the figure, the same parts are given the same numerals as in FIG. 1.

The base 1 contains an illumination optical system for illuminating the specimen 4. In the rear of the base 1, the lamp housing 11 is provided. The lamp housing 11 has the lamp 9 and a collector lens 10 which collects light emitted from the lamp 9.

The illumination optical system includes a diffusing plate 20, a field stop 21 whose aperture is adjustable, and a mirror 22 for bending light, all of which are disposed in an optical path of light emitted from the lamp housing 11, a window lens 23 being provided in an optical path of light reflected by the mirror 22. The window lens 23 is installed on top of the base 1. Accordingly, after properly diffused by the diffusing plate 20, light emitted from the lamp housing 11 passes through the field stop 21. Then the light is bent up by the mirror 22 for bending light and concentrated on the specimen 4 on the stage 5 by the window lens 23.

The base 1 supports an aiming handle 24 for lifting the stage 5 so that it can be turned freely. A pinion gear 25 which is in operative communication with the aiming handle is engaged with a rack 27 installed through a planetary gear 26 on the stage 5.

An objective lens 7 is installed through a revolver 6 to the bottom of the arm 3, and a lens tube 29 is installed through a modification changer 28 as an intermediate lens tube, to the top of the arm.

The base 1, frame 2, and arm 3, which are made independently of one another, are combined together, using, e.g., a plurality of fastening members (bolts, screws, etc.) 30 and 31 to from the microscope body. That is, the fastening members 30 are used to fasten the base 1 and frame 2 together, and the fastening members 32 are used to fasten the frame 2 and the arm 3 together.

The receptacles receiving the fastening members 30 at the bottom of the frame 2 are formed as protrusions 32 so that the area of contact between the base 1 and the frame 2 is larger than a predetermined area (the cross-sectional area of the frame 2). For example, the protrusions 32 are formed to be round in cross section so that they surround the fastening members 30. The protrusions increase resistance to heat conduction from the base 1 to the frame 2 to reduce the amount of heat which is generated from the lamp 9 and conducted from the base 1 to the frame 2. The protrusions 32 may be formed on the side of the frame 2 as shown in the figure, the side of the base 1, or both sides of the frame 2 and base 1.

Accordingly, the protrusions 32 form the area of contact between the base 1 and the frame 2 so that the amount of heat conducted from the base 1 to the frame 2 according to the thermal conductivity of material from which the base 1 and the frame 2 are formed is reduced to a predetermined value.

Because the base 1 and the frame 2 are formed independently of each other and what need to be machined, such as the supports for aiming units including optical parts, an aiming handle, etc. are concentrated on the base 1, machined portions concerning the arm 3 and frame 2 correspond to only portions for fastening them and a potion to which another unit is installed. With the structure, the number of machined portions can be kept to a minimum, so that it is effective to form the frame 2 and arm 3 with material which is highly rigid and hardly deforms due to heat yet is difficult to cut, such as ceramic or ceramic-containing metal (e.g., aluminum alloy as the ceramic-containing metal).

Because rigidity and thermal deformation depend on a problem of the relative displacement of the objective lens 7 with respect to the stage 5, the base 1 which does not cause the problem is typically formed using ordinary free cutting material (e.g., aluminum alloy). To reduce deformation of the frame 2, it is formed using material which has a lower coefficient of thermal expansion than material used for the base 1 and is difficult to cut. On the other hand, the base 1 is formed using a free cutting material to make the base 1 easy to machine.

In this embodiment, the base 1 and the arm 3 are made of ordinary aluminum alloy, whereas the frame 2 is made of ceramic-containing aluminum alloy which has a lower coefficient of thermal expansion than the ordinary aluminum alloy.

As the ordinary aluminum alloy, aluminum alloy for die-casting, i.e., ADC12 specified by JIS (Japanese Industrial Standards) H 5302 is used. Otherwise, ADC10 specified by JIS H 5302 may be used. Instead, aluminum alloy for casting, i.e., AC2A or AC2B each specified by JIS H 5202 may be used. A coefficient of thermal expansion of these ordinary aluminum alloys (i.e., the aluminum alloy for die-casting and the aluminum alloy for casting) is approx. $20\times10^{-6}/°$ C.

On the other hand, as the ceramic-containing aluminum alloy, aluminum alloy containing 75%-aluminum and 25%-ceramic is used. A coefficient of thermal expansion of the ceramic-containing aluminum alloy is approx. $15\times10^{-6}/°$ C. Note that the percentage of the ceramic may be in the range of 20% to 30%. In this case, the coefficient of thermal expansion is in the range of approx. $14\times10^{-6}/°$ C. to $16\times10^{-6}/°$ C.

The operation of a microscope with such a structure is described below.

During transmitted-light observation of the specimen 4, light emitted from the lamp housing 11 passes through the field stop 21 after properly diffused by the diffusing plate 20. Then the light is bent up by the mirror 22 for bending light and concentrated on the specimen 4 on the stage 5 by the window lens 23.

Heat generated from the lamp 9 while it is lit is conducted from the base 1 to the frame 2. The frame 2 expands due to heat from the lamp 9, and the distance between the stage 5 bearing the specimen 4 and the objective lens 7 changes by a few micrometers. This change greatly affects the excessively narrow focal depth range of a conventional microscope, resulting in undesirable movement of the already adjusted focal point. In contrast, because the base 1, frame 2, and arm 3 are formed independently of one another, a thin air layer which is formed between the base 1 and frame 2 and between the frame 2 and arm 3 provides thermal resistance, thereby reducing heat conduction from the base 1 to the frame 2, that is, making it difficult for heat to be conducted from the base to the frame, compared with a conventional one-piece microscope.

In a microscope of the embodiment, the base 1 and the frame 2 are in contact with each other through the plurality of protrusions 32 formed at the bottom of the frame 2, so that the thermal resistance between the base 1 and the frame 2 further increases, thereby reducing conduction of heat generated from the lamp 9 from the base 1 to the frame 2.

As a result, the frame 2 expands less due to heat, and the distance between the stage 5 bearing the specimen 4 and the objective lens 7 is kept appropriate. In addition, an adjusted focal point does not move even if the microscope has an excessively small focal depth.

Because the frame 2 is made of material which has a lower coefficient of thermal expansion than material used for the base 1 and is difficult to cut, deformation of the frame 2 can be reduced. On the other hand, because the base 1 is formed using free cutting material, the base is made easy to machine.

Figure 1:
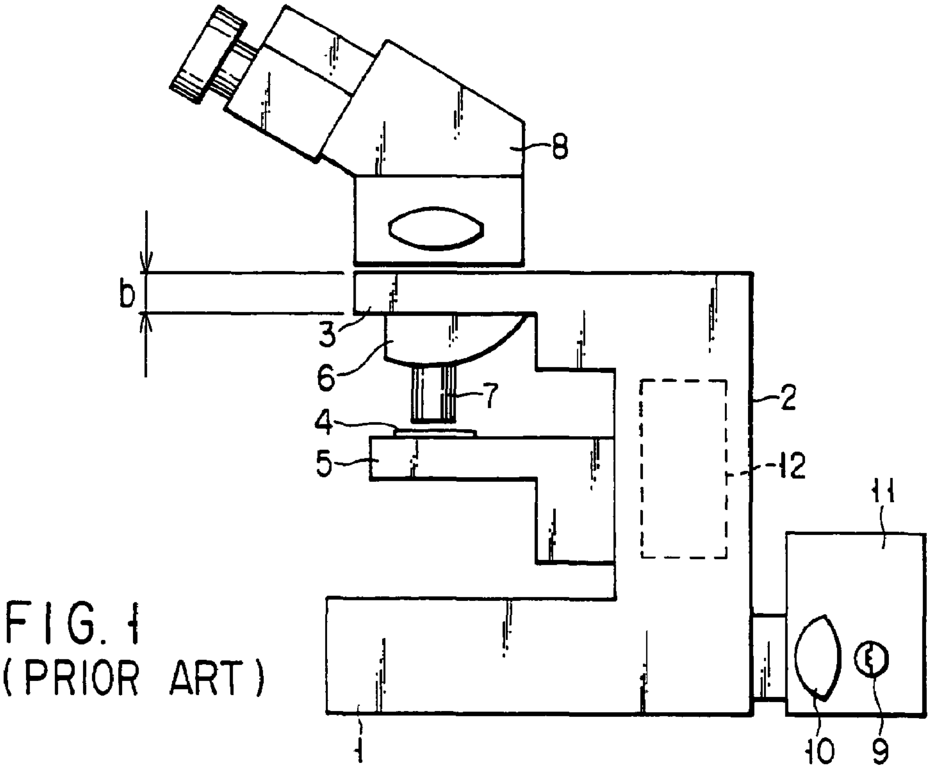
FIG. 1 shows the schematic structure of a conventional transmitted-light type microscope.

Because a microscope of the embodiment incorporates no reflected-light floodlight tube if it is designed to be suitable for transmitted-light observations, the thickness of the arm 3, b', can be made larger than the thickness of the arm 3 of a conventional microscope in FIG. 1, b, so that the arm 3 is more rigid if the range a is limited as shown in FIG. 8.

Further, the base 1, a frame 2, and an arm 3 of the microscope are made independently of one another. The frame 2 and arm 3 are made of materials which differ in coefficient of thermal expansion from each other for upward displacement of the objective lens 7 due to thermal elongation of the frame 2 to be canceled by downward displacement of the objective lens 7 due to bending (curving) of the arm 3 (see FIG. 12).

During transmitted-light observation of the specimen 4, light emitted from the lamp housing 11 is concentrated through the transmitted-light optical system on the specimen 4.

That is, heat generated from the lamp 9 while it is lit is conducted from the base 1 to the frame 2, so that the fame 2 expands in the direction indicated by an arrow X. The objective lens 7 moves up away from the specimen 4 due to elongation of the frame 2.

However, because the frame 2 is formed using material which has a lower coefficient of thermal expansion than material used for the arm 3, a force is applied to the fastening members 31 in the direction indicated by an arrow Y. Accordingly, the arm 3 heavily deforms, and the objective lens 7 side of the arm 3 moves down (in the direction indicated by an arrow Z). Namely, the objective lens 7 moves down.

Downward displacement of the objective lens 7 due to deformation of the arm 3 occurs in such a direction that the displacement of the object lens cancels the above-mentioned upward displacement of the objective lens 7 due to elongation of the frame 2. Accordingly, a focal point shift due to thermal expansion can be reduced.

Because an ordinary stage 5 may be used which is not long, rigidity does not deteriorate.

Figure 12:
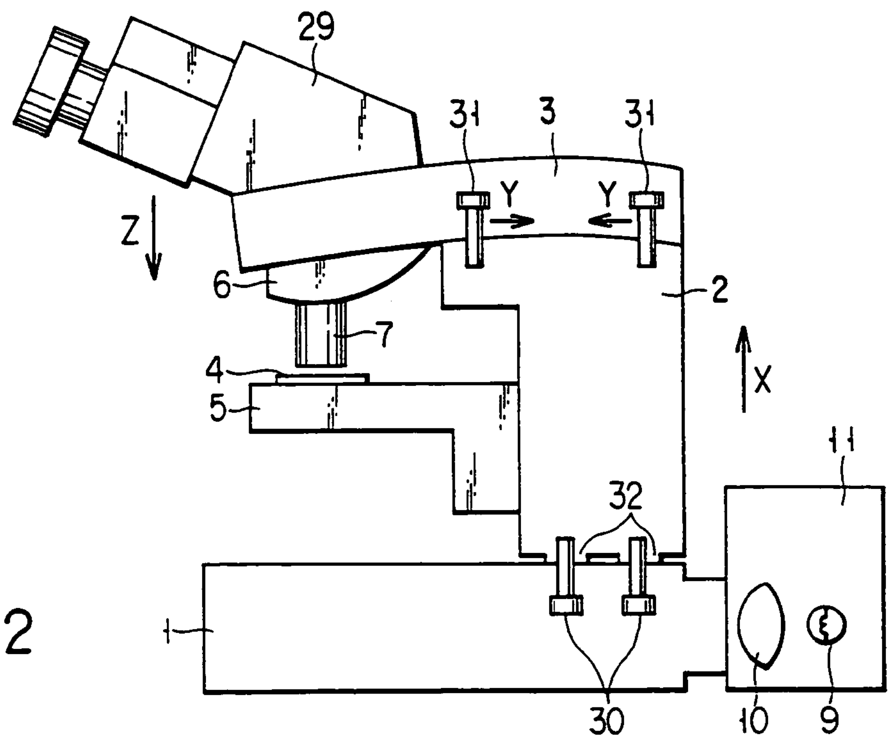
FIG. 12 illustrates thermal elongation of a frame and a bending of an arm in a transmitted-light type microscope according to the present invention.

In FIG. 12, displacement of the frame 2 and the arm 3 is exaggerated. The arm 3 actually inclines only to the extent that no observation problem arises.

Steel may be used as material which has a lower coefficient of thermal expansion than aluminum alloy.

Further, instead of making the frame 2 and the arm 3 separately from each other, they may be made as a monolithic member (i.e., a frame-arm member). In this case, thermal deformation can be suppressed by forming the member using the material which has a lower coefficient of thermal expansion, whereas the operation and advantage as described with reference to FIG. 12 cannot be attained because the frame 2 and the arm 3 have the same coefficient of thermal expansion.

[Second Embodiment]

Referring now to drawings, the second embodiment of the present invention is described below.

Figure 10:
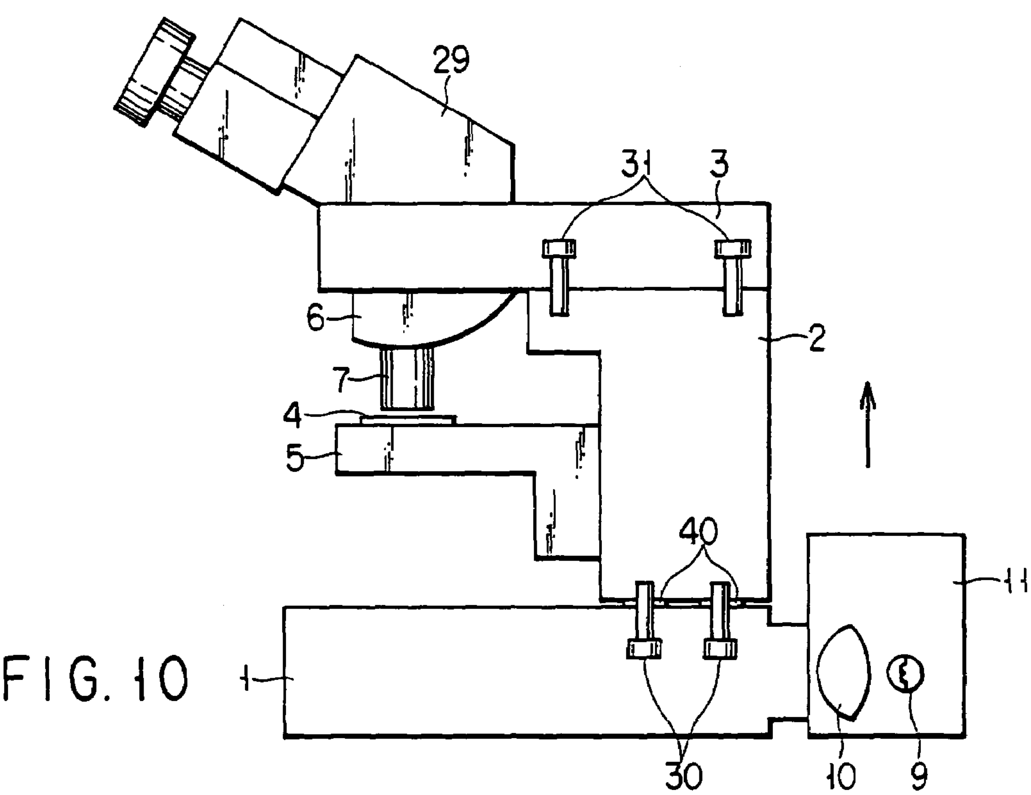
FIG. 10 shows the structure of a transmitted-light type microscope according to a second embodiment of the present invention.

FIG. 10 shows the structure of a transmitted-light type microscope. In the figure, the same parts are given the same numerals as in FIG. 8, and detailed descriptions of these parts are omitted.

The base 1 and the frame 2 are secured through a washer 40 to each fastening member 30. These washers 40 are made of, e.g., resin.

The washers 40 reduce the amount of heat conducted from the base 1 to the frame 2 to a predetermined value.

The operation of a microscope with such a structure is described below.

When the lamp 9 is lit, heat generated from the lamp 9 is conducted from the base 1 to the frame 2. However, because the base 1, frame 2, and arm 3 are formed independently of one another and because the base 1 and frame 2 are secured through the washers 30 to each fastening member 30, thermal resistance between the base 1 and frame 2 increases, thereby reducing conduction of heat generated from the lamp 9 from the base 1 to the frame 2.

Accordingly, as is the case with the first embodiment, the frame 2 less expands due to heat, and the distance between the stage 5 bearing the specimen 4 and the objective lens 7 is kept appropriate. In addition, an adjusted focal point does not move even if the microscope has an excessively small focal depth.

[Third Embodiment]

Referring now to drawings, the third embodiment of the present invention is described below.

Figure 2:
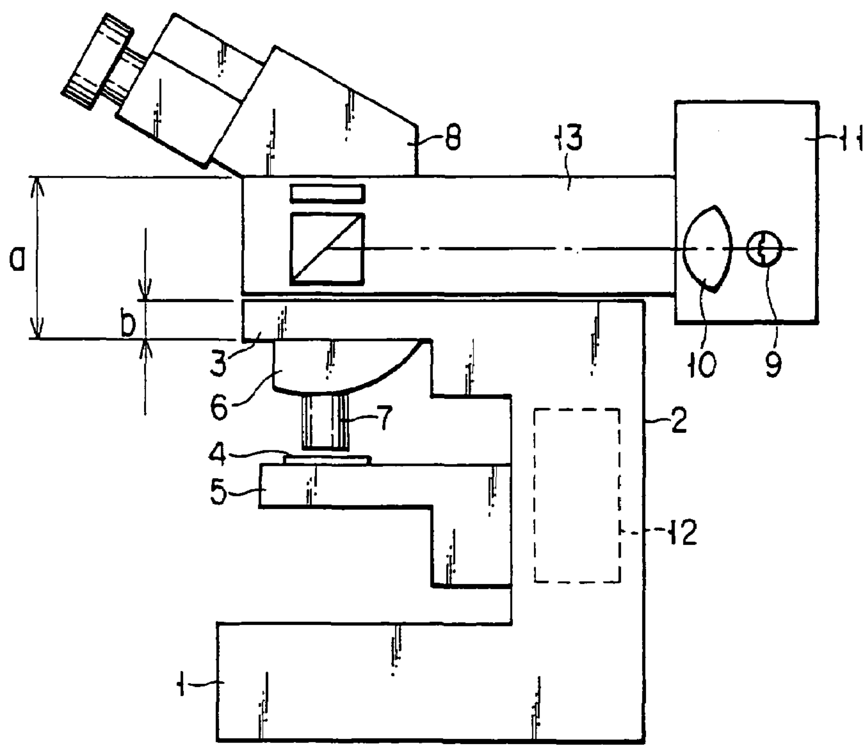
FIG. 2 shows the schematic structure of a conventional reflected-light type microscope.
Figure 3:
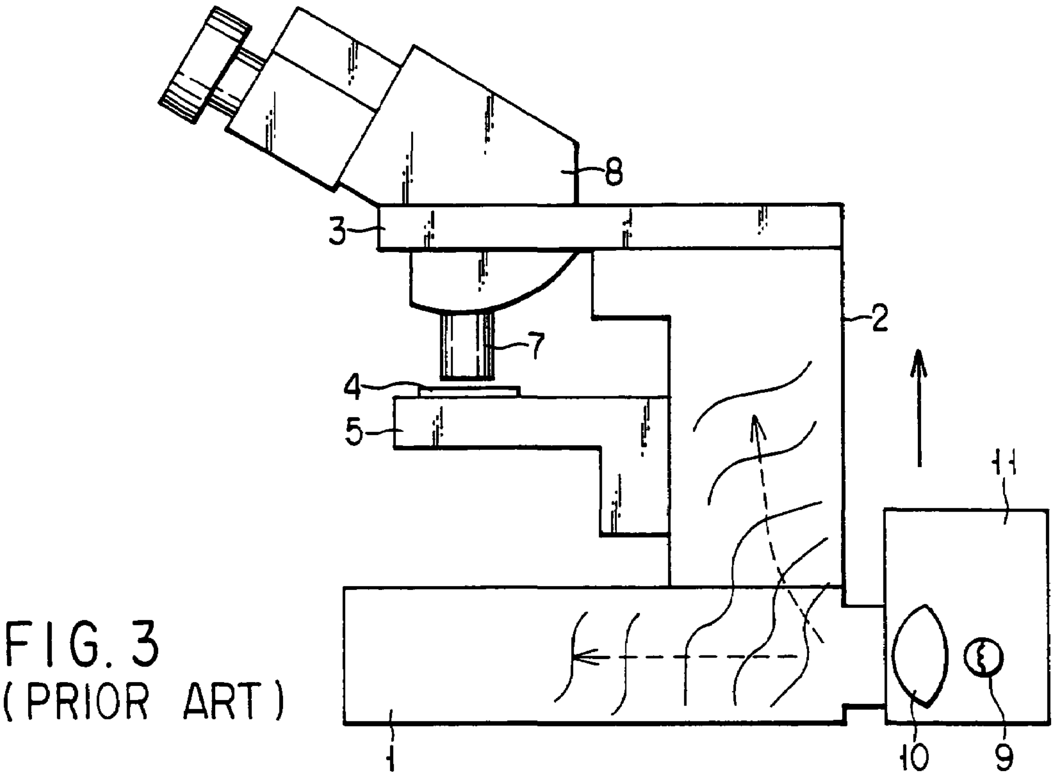
FIG. 3 is a schematic illustrating heat conduction to a microscope body.
Figure 11:
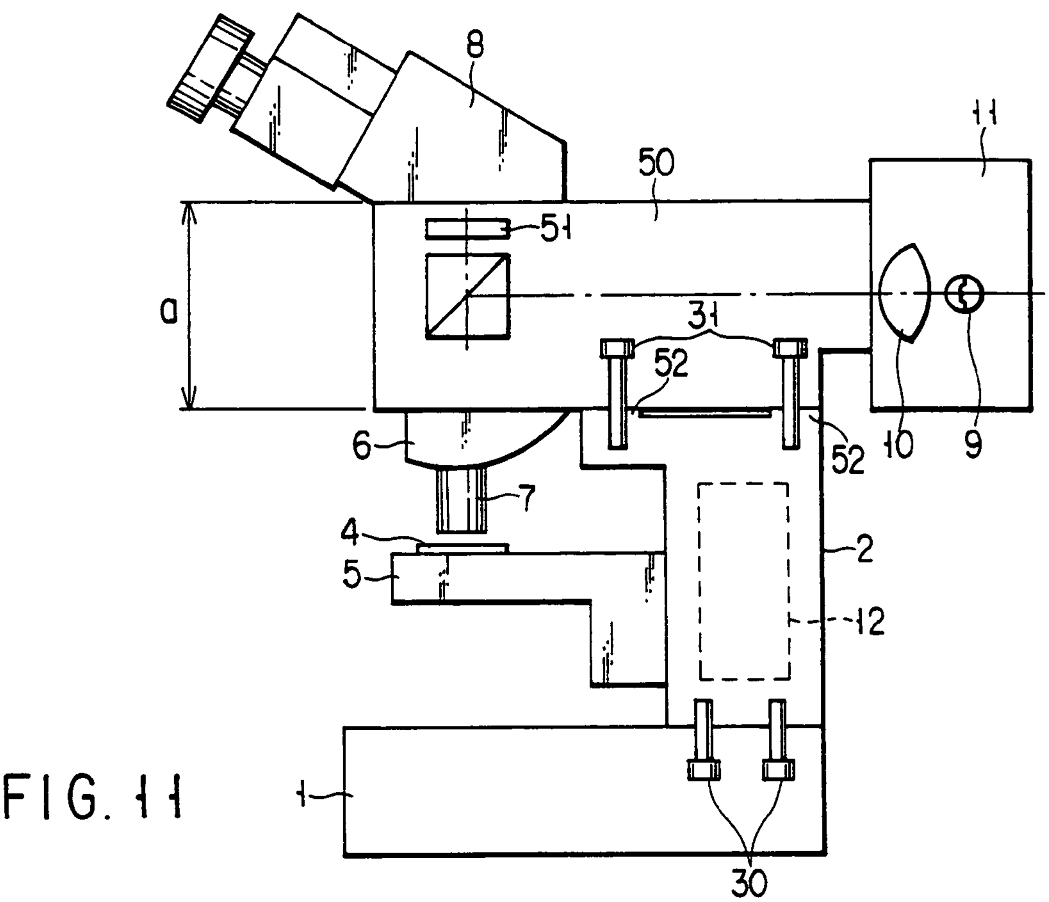
FIG. 11 shows the structure of a reflected-light type microscope according to a third embodiment of the present invention.

FIG. 11 shows the structure of a reflected-light type microscope. In the figure, the same parts are given the same numerals as in FIG. 2, and detailed descriptions of these parts are omitted.

A reflected-light floodlight tube 50 is provided as a reflected-light optical system on the frame 2. The reflected-light floodlight tube 50, which has a space required for a diffusing plate to be installed, is provided in the rear with the lamp housing 11.

The base 1, frame 2, and reflected-light floodlight tube (or an arm) 50 are made independently of one another. The fastening members (bolts, screws, etc.) 30 are used to fasten the base 1 and frame 2 together, and the fastening members 32 (bolts, screws, etc.) are used to fasten the frame 2 and the reflected-light floodlight tube 50 together.

In this embodiment, the base 1 and the reflected-light floodlight tube 50 are made of ordinary aluminum alloy, whereas the frame 2 is made of ceramic-containing aluminum alloy which has a lower coefficient of thermal expansion than the ordinary aluminum alloy. Materials for these aluminum alloys are the same as described in the first embodiment.

The receptacles receiving the fastening members 31 on top of the frame 2 are formed as protrusions 52 so that the area of contact between the frame 2 and the reflected-light floodlight tube 50 is smaller than a predetermined area (the cross-sectional area of the frame 2). In other words, a recess (or a clearance) is formed between the two protrusions 52. For example, the protrusions 52 are formed to be round in cross section so that they surround the fastening members 31. The protrusions increase resistance to heat conduction from the frame 2 to the reflected-light floodlight tube 50 to reduce the amount of heat which is generated from the lamp 9 and conducted from the reflected-light floodlight tube 50 to the frame 2.

The protrusions 52 may be formed on the side of the frame 2 as shown in the figure, the side of the reflected-light floodlight tube 50, or both sides of the frame 2 and reflected-light floodlight tube 50.

The operation of a microscope with such a structure is described below.

During reflected-light observation of the specimen 4, light emitted from the lamp housing 11 is concentrated through the reflected-light floodlight tube 50 on the specimen 4.

When the lamp 9 is lit, heat generated from the lamp 9 is conducted from the reflected-light floodlight tube 50 to the frame 2. However, because the base 1, frame 2, and reflected-light floodlight tube 50 are formed independently of one another and because the frame 2 and reflected-light floodlight tube are in contact with each other through the plurality of protrusions 52, thermal resistance between the reflected-light floodlight tube and frame 2 increases, thereby reducing conduction of heat generated from the lamp 9 from the reflected-light floodlight tube 50 to the frame 2.

Accordingly, as is the case with the first embodiment, the frame 2 less expands due to heat, and the distance between the stage 5 bearing the specimen 4 and the objective lens 7 is kept appropriate. In addition, an adjusted focal point does not move even if the microscope has an excessively small focal depth.

A microscope of the embodiment can be made highly rigid because the reflected-light floodlight tube 50 allows a section a, including the thin arm 3 and the reflected-light optical system 13 as shown in FIG. 1, to be formed as a monolithic unit.

Further, like the first embodiment, the frame 2 is made of material which has a lower coefficient of thermal expansion than material used for the reflected-light floodlight tube 50, so that the same operation and advantage as described with reference to FIG. 12 can be attained. Note that, in the reflected-light type microscope as shown in FIG. 11, the reflected-light floodlight tube 50 corresponds to the "arm".

Instead of making the base 1 and the frame 2 separately from each other, they may be made as a monolithic member (i.e., a base-frame member). In this case, thermal deformation can be suppressed by forming the member using the material which has a lower coefficient of thermal expansion, whereas the operation and advantage as described with reference to FIG. 12 cannot be attained because the frame 2 and the reflected-light floodlight tube 50 have the same coefficient of thermal expansion.

[Fourth Embodiment]

Referring now to drawings, the fourth embodiment of the present invention is described below.

The present invention is not limited to the first through fourth embodiments but may be modified as described below.

Figure 13:
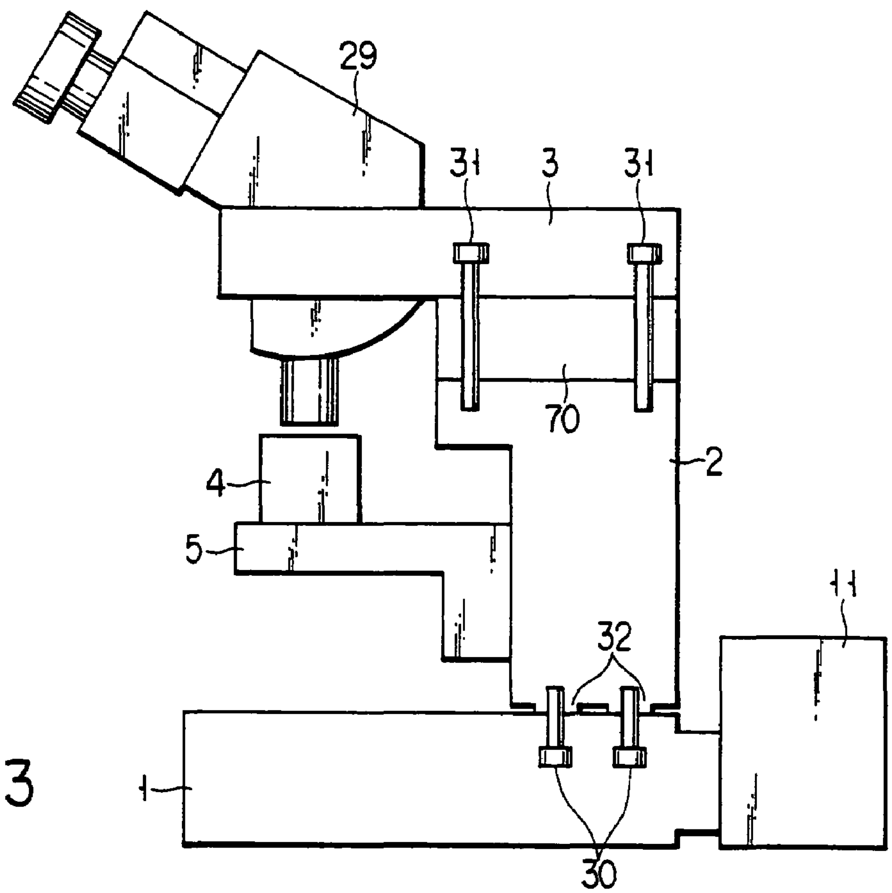
FIG. 13 shows the structure of a transmitted-light type microscope according to a fourth embodiment of the present invention.

For example, if a thick specimen 4 which cannot be covered by the stroke length of the stage 5 is observed under such a microscope as shown in FIG. 13, a spacer may be interposed between the frame 2 and the arm 3 to secure these assemblies.

[Fifth Embodiment]

Referring now to drawings, the fifth embodiment of the present invention is described below.

Figure 4:
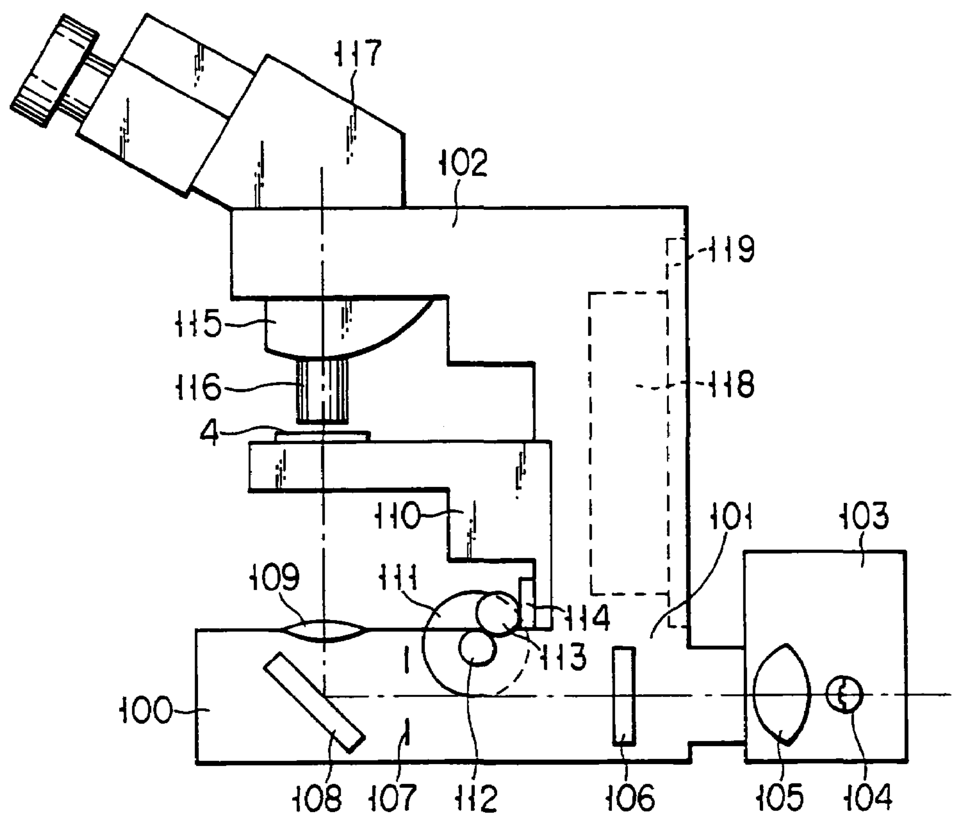
FIG. 4 shows the structure of a conventional microscope which incorporates a power supply at its back.
Figure 5:
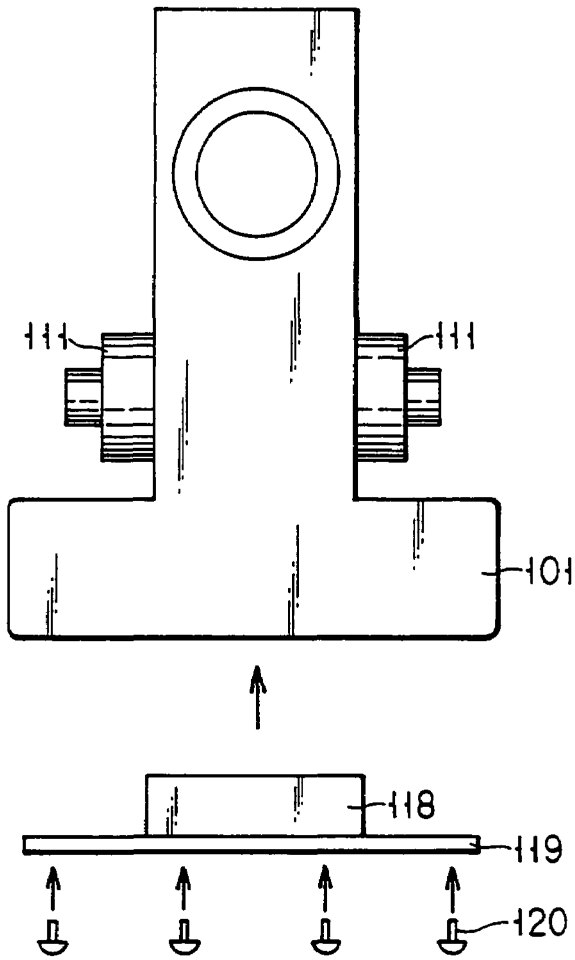
FIG. 5 is a top view of the microscope.
Figure 6:
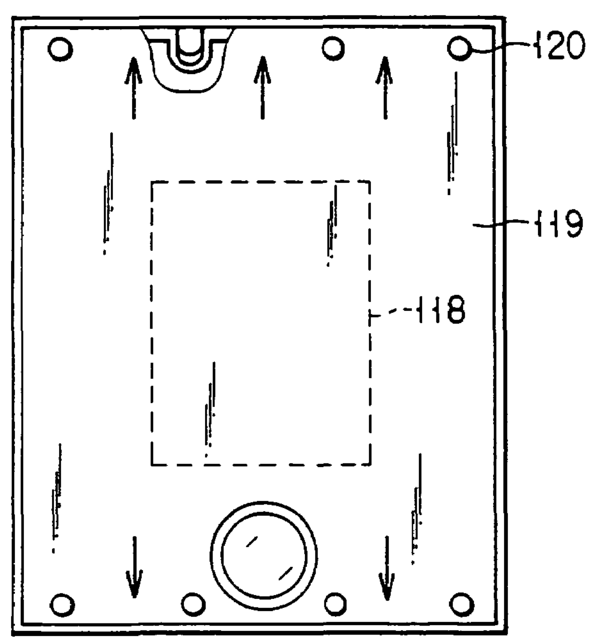
FIG. 6 is a rear view of the microscope.
Figure 14:
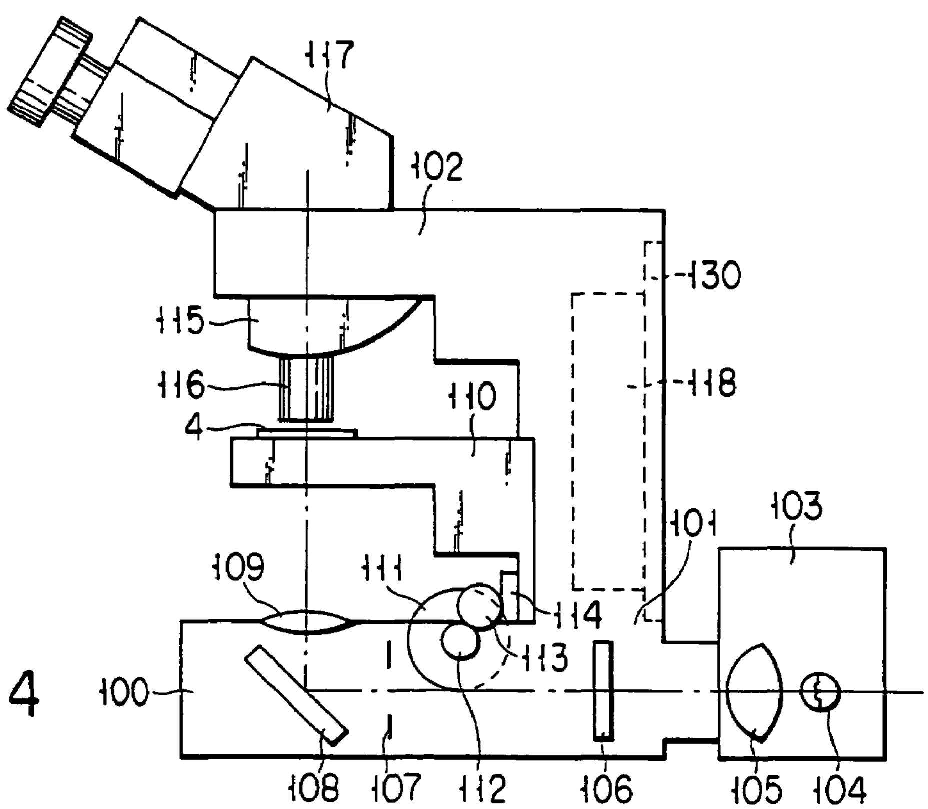
FIG. 14 shows the structure of a transmitted-light type microscope according to a fifth embodiment of the present invention.

FIG. 14 shows the structure of a transmitted-light type microscope. In the figure, the same parts are given the same numerals as in FIG. 4, and detailed descriptions of these parts are omitted.

Figure 15:
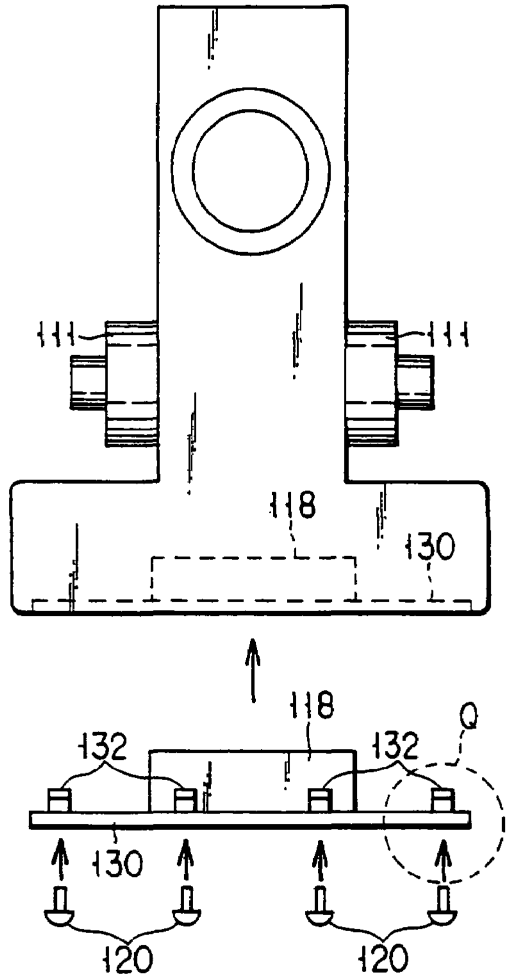
FIG. 15 is a top view of the transmitted-light type microscope.
Figure 16:
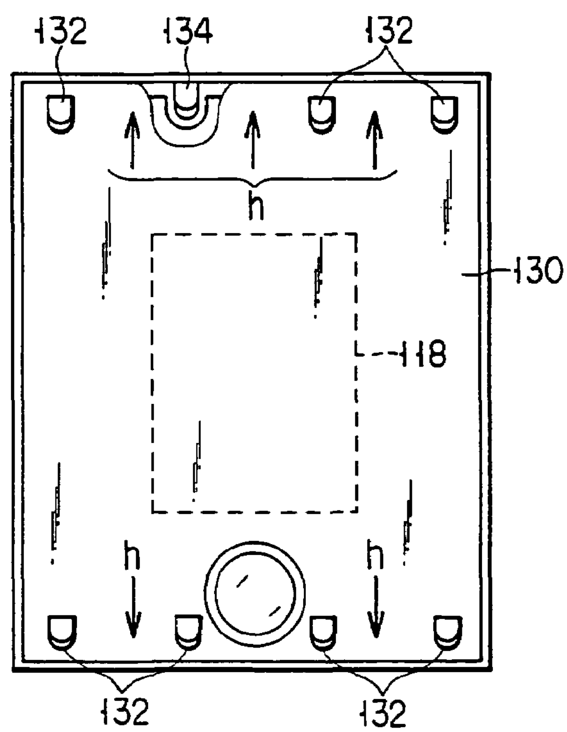
FIG. 16 is a rear view of the transmitted-light type microscope.

The support 101 of the microscope body contains the power supply 118 secured to a metal plate 130, which is at the back of the body. FIG. 15 is a top view of the microscope, and FIG. 16 is its rear view. The power supply 118 is secured not only to the metal plate 130 but to the support 101 of the microscope body, using a plurality of fastening members, such as screws 120.

Figure 17A:
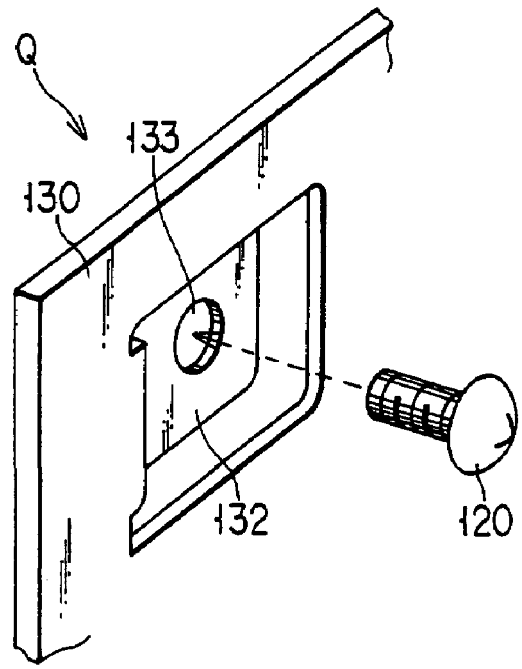
FIGS. 17A and 17B are enlarged views of the fixture for a metal plate used for the microscope.
Figure 17B:
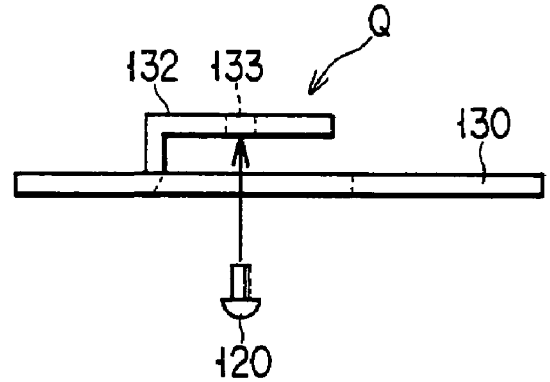

FIGS. 17A and 17B are an enlarged perspective view and an enlarged side view of a fastening structure Q for fastening the metal plate 130 using a screw 120, respectively.

The fastening structure Q for fastening the metal plate 130 includes a fastener 132, which is resilient. The fastener 132, which is formed by making a U-shaped cut in the metal plate 130 and hooking the U-shaped portion, absorbs elongation of the metal plate due to heat. The fastener 132 is provided with a fastening hole 133 into which the screw 120 is inserted.

Figure 18:
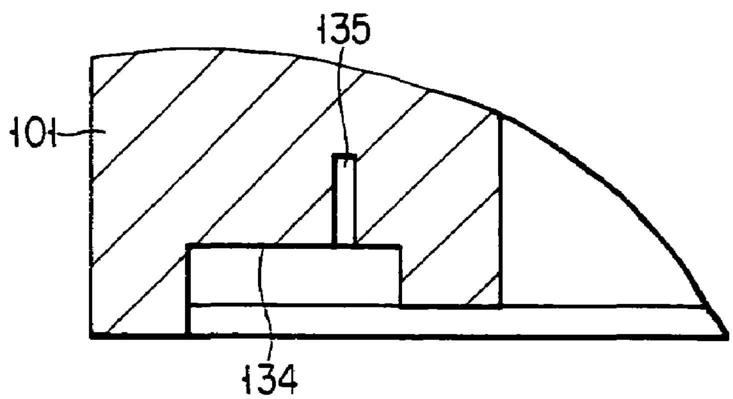
FIG. 18 shows the structure of the body of the microscope.

As shown in FIG. 18, the fasteners secured by the screws 120 on the side of the support 101 for the microscope body are provided with recesses 134. The fasteners 132 formed in the metal plate 130 are fit into the recesses 134. As shown in FIG. 16, the recesses 134 are formed in a direction h in which deformation (expansion) occurs due to heat from the power supply 118. At the bottom of the recesses 134, a threaded hole 135 is formed which engage with the screw 120.

The operation of a microscope with such a structure is described below.

During observation under the microscope, the power supply 118 feeds power to a lamp 104 to turn it on and heats up. Heat from the power supply 118 is conducted to the metal plate 130, so that the plate expands due to heat, for example, in the direction h, as shown in FIG. 16.

When the metal plate 130 expands due to heat, the fasteners 132 formed in the metal plate 130 absorb elongation of the metal plate 130 due to heat because they are resilient.

Even if the metal plate 130 elongates due to heat, elongation does not affect the microscope body because it is absorbed by the fasteners 132. Accordingly, an image blur caused by deformation of the metal plate 130 due to heat from the power supply 118 decreases, resulting in a good specimen image.

The embodiment has been described using as an example a microscope of such a type that the base 100, support 101, and arm 102 are integrated as a microscope body (FIG. 14). The present invention is not limited to a microscope of such a type. It can also apply to a microscope of such a type that a base, a frame, and an arm which are made independently of one another are combined into one (for example, a microscope in FIG. 8). In such a microscope, a metal plate with a power supply is secured to the frame.

[Sixth Embodiment]

Referring now to drawings, the sixth embodiment of the present invention is described below.

Figure 7:
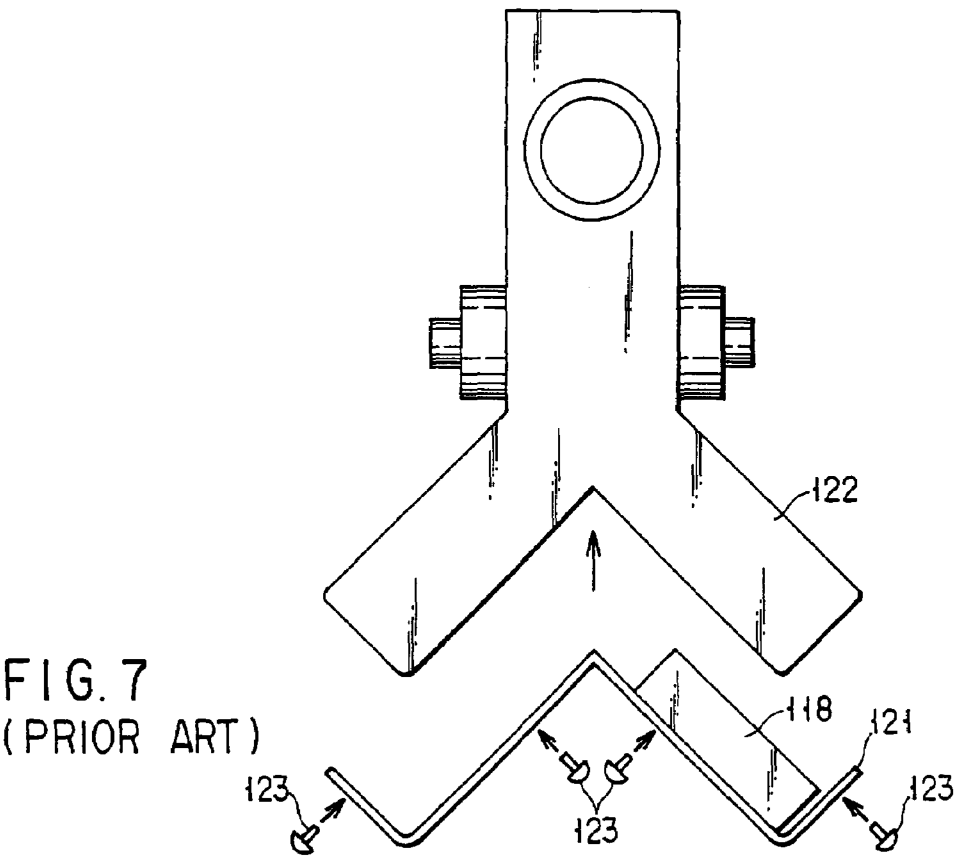
FIG. 7 shows a power supply connected to a conventional Y type microscope.
Figure 19:
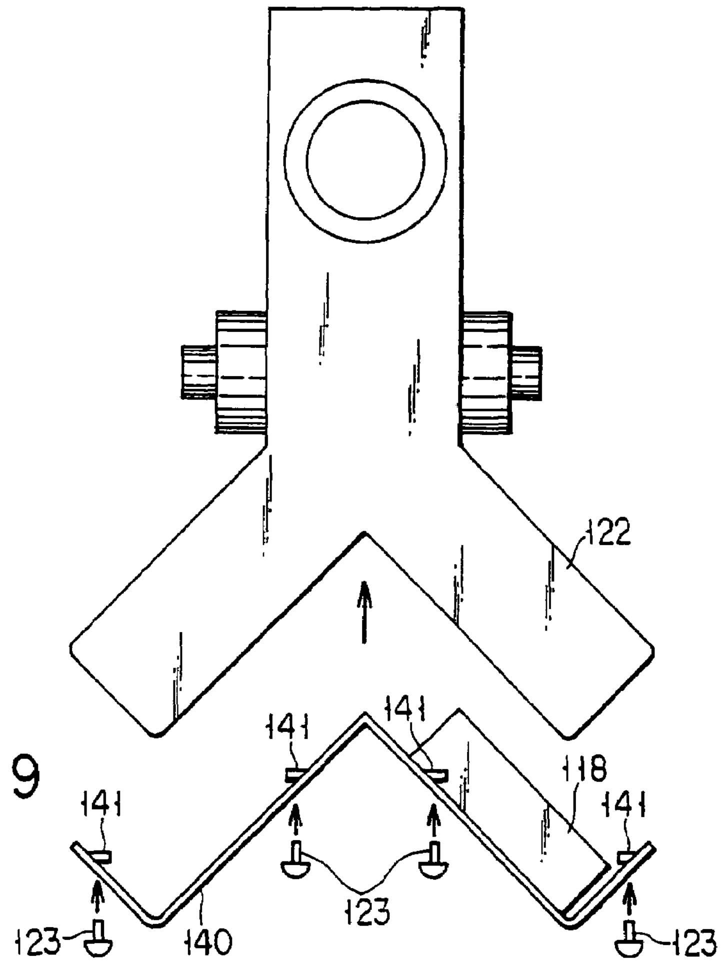
FIG. 19 shows the structure of a Y type microscope according to a sixth embodiment of the present invention as viewed from above.
Figure 20:
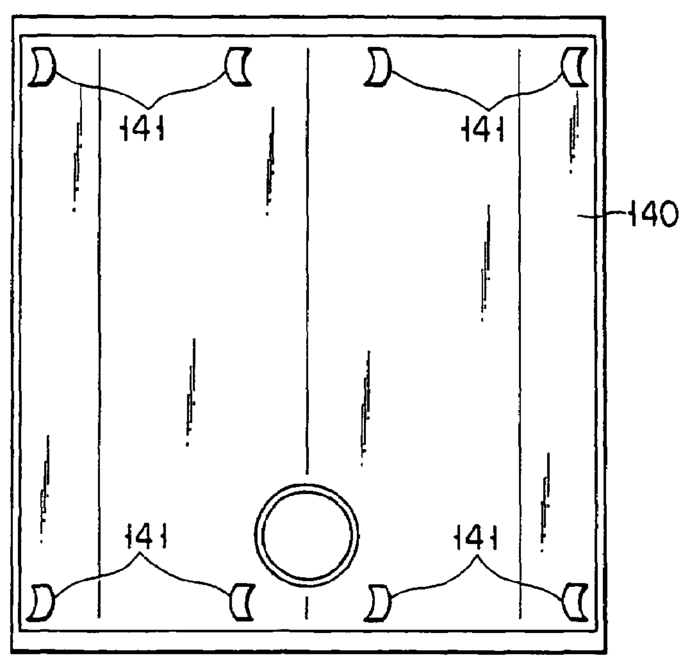
FIG. 20 shows the structure of the Y type microscope as viewed from the back.

FIG. 19 shows the structure of a Y type microscope as viewed from above, and FIG. 20 is a rear view of the microscope. In these figures, the same parts are given the same numerals as in FIG. 7, and detailed descriptions of these parts are omitted.

The power supply 118 is secured to a W-shaped metal plate 140. The W-shaped metal plate 140 is secured to the back of the Y type microscope body, using a plurality of fastening members, such as screws 123. The fasteners in the metal plate 140 are each provided with a tab 141. These tabs 141, which are formed by cutting the metal plate 140 and bending the cut portions in the same direction, absorb elongation of the metal plate 140 due to heat. The tabs 141 are each provided with a fastening hole into which a screw 123 is inserted.

The fasteners secured by the screws 123 on the side of the Y type microscope body are each provided with a recess, which is not shown. The tabs 141 formed in the metal plate 140 are fit into the recesses.

The operation of a microscope with such a structure is described below.

During observation under the microscope, the power supply 118 turns on the lamp 104 and heats up. Heat from the power supply 118 is conducted to the metal plate 140, so that the plate expands due to heat. When the metal plate 140 expands due to heat, the tabs 141 formed in the metal plate 140 absorb elongation of the metal plate 140 due to heat because they are resilient.

Even if the metal plate 140 elongates due to heat, elongation does not affect the Y type microscope body because it is absorbed by the tabs 141. Accordingly, an image blur caused by deformation of the metal plate 140 due to heat from the power supply 118 decreases, resulting in a good specimen image.

The tabs 141 are formed by cutting the metal plate 140 and bending the cut portions in the same direction. Because of this, to secure the metal plate 140 to the back of the Y shape microscope body using the plurality of screws 123, the microscope body 122 can be tapped, and the screws 123 can be installed in the same direction, thereby increasing machinability and the ease of assembly.

The fasteners 131 and 141 of the fifth and sixth embodiments are not limited to the shapes described above provided that the fasteners are resilient. For example, the direction in which the fasteners are formed and their size may be changed at will.

[Seventh Embodiment]

Referring now to drawings, the seventh embodiment of the present invention is described below.

Figure 21:
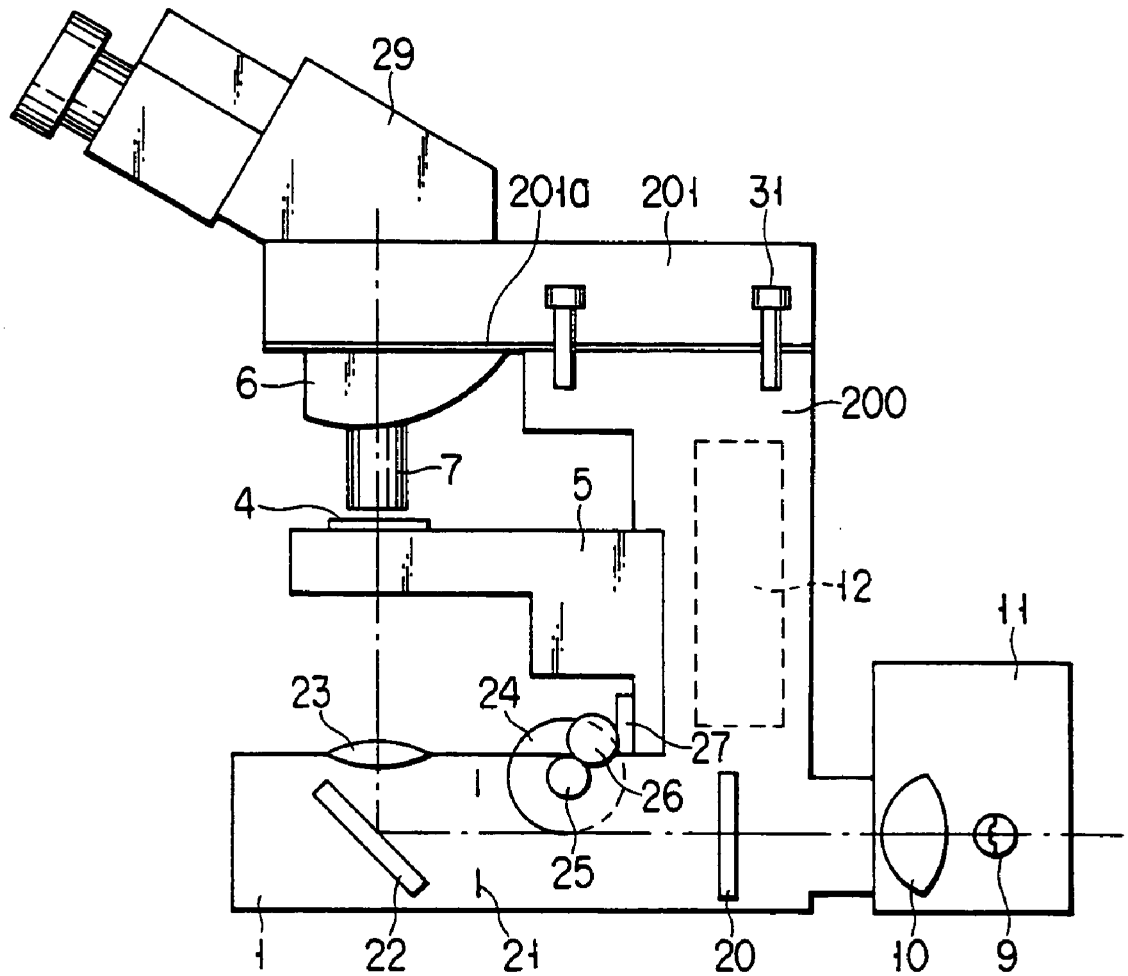
FIG. 21 shows the structure of a transmitted-light type microscope according to a seventh embodiment of the present invention.

FIG. 21 shows the structure of a transmitted-light type microscope. In the figure, the same parts are given the same numerals as in FIG. 8, and detailed descriptions of these parts are omitted.

The base 1 and a frame 200 of the microscope are formed as a one-piece base-frame member, and an arm 201 of the microscope is formed independently of the base-frame member. The frame 200 and arm 201 are made of materials which differ in coefficient of thermal expansion from each other for upward displacement of the objective lens 7 due to thermal elongation of the frame 200 to be canceled by downward displacement of the objective lens 7 due to bending (curving) of the arm 201.

Figure 22:
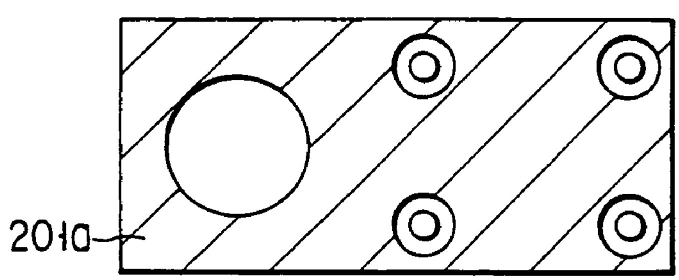
FIG. 22 shows the configuration of material sprayed on the bottom of the arm of the microscope.

In this embodiment, as shown in FIG. 22, material 201*a* is sprayed on the bottom of the arm 201, excluding an area near locations at which the arm is attached to the frame 200. The material 201*a* has a lower coefficient of thermal expansion than the material which the arm 201 is made of. If the arm 201 is made of aluminum alloy, spraying ceramic material is effective.

Instead of spraying the material 201*a* on the bottom of the arm 201, the material may be sprayed on top of the frame 200.

The operation of a microscope with such a structure is described below.

During transmitted-light observation of the specimen 4, light emitted from the lamp housing 11 is concentrated through the transmitted-light optical system on the specimen 4.

Figure 23:
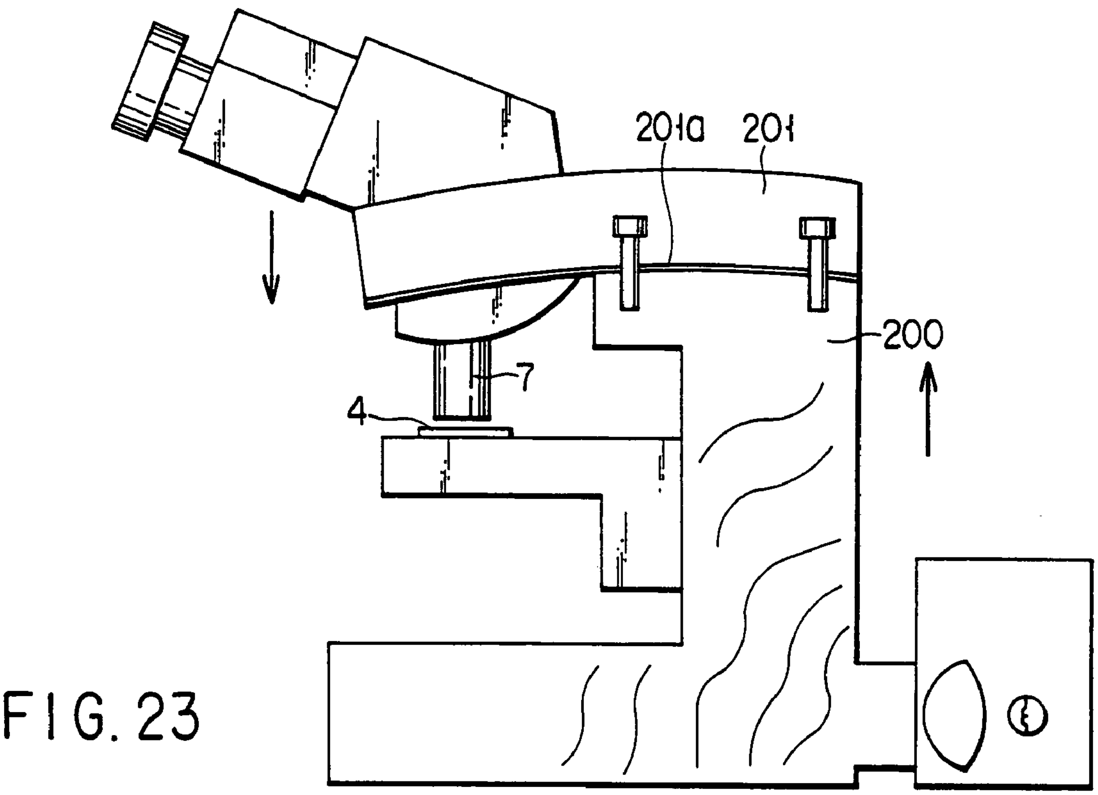
FIG. 23 illustrates heat conduction to a frame and the arm of the microscope.

Heat generated from the lamp 9 while it is lit is conducted from the base 1 to the frame 200 as shown in FIG. 23, so that the frame 200 expands upward due to heat. The objective lens 7 moves up away from the specimen 4 due to elongation of the frame 200.

However, when the arm 201 expands due to heat conducted thereto, it heavily deforms (curves), and thus the objective lens 7 side of the arm 201 moves down because the material 201*a* which is sprayed on the bottom of the arm 201 has a lower coefficient of thermal expansion than the arm 201. That is, the objective lens 7 moves down.

Downward displacement of the objective lens 7 due to deformation of the arm 201 occurs in such a direction that the displacement of the object lens cancels the above-mentioned upward displacement of the objective lens 7 due to elongation of the frame 200. Accordingly, a focal point shift due to thermal expansion can be reduced.

According to the seventh embodiment, both arm 201 and frame 200 which have a complex structure can be formed using aluminum alloy, which features good formability and machinability. In addition, rigidity does not deteriorate because an ordinary stage 5 may be used which is not long.

In the figure, displacement is exaggerated. However, the arm 201 actually inclines only to the extent that no observation problem arises.

In the embodiment, material with a low coefficient of thermal expansion is sprayed on the bottom of the arm 201. However, spraying on top of the arm 201 material which has a higher coefficient of thermal expansion than the material sprayed on the bottom of the arm provides the same results.

Figure 24:
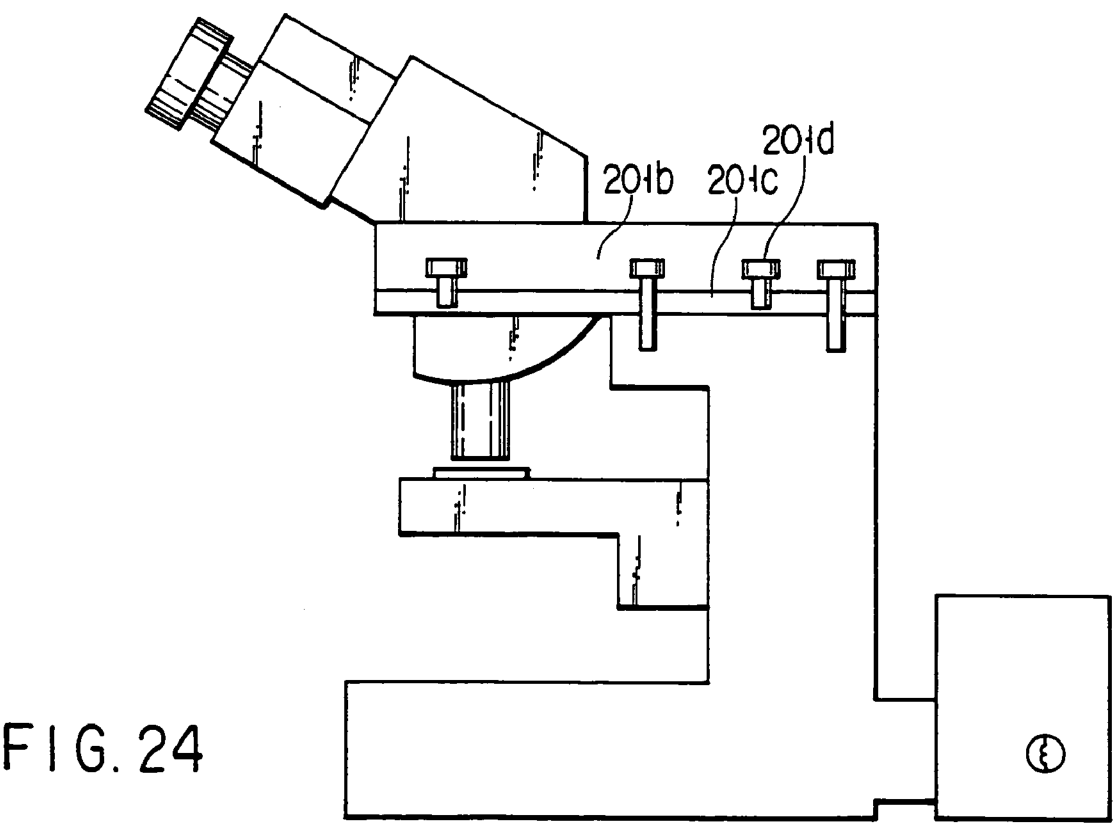
FIG. 24 shows a modification of the microscope.

To modify the embodiment, the arm is divided into two as shown in FIG. 24. If the upper arm half 201*b* and the lower arm half 201*c* are combined together using a plurality of fastening members 201*d*, and the lower arm half 201*c* is made of material with a lower coefficient of thermal expansion, compared with the upper arm half 201*b*, the same effect can be obtained. The upper arm half 201*b* and the lower arm half 201*c* may be combined together, using not only the fastening members 201*d* but an adhesive.

Further, the various structures described in this embodiment, in which materials which differ in coefficient of thermal expansion from each other are sprayed, is adaptable to the case of the reflected-light type microscope shown in FIG. 11. In this case, the "arm" corresponds to the reflected-light floodlight tube 50 in FIG. 11.

[Eighth Embodiment]

Referring now to drawings, the eighth embodiment of the present invention is described below.

Figure 25:
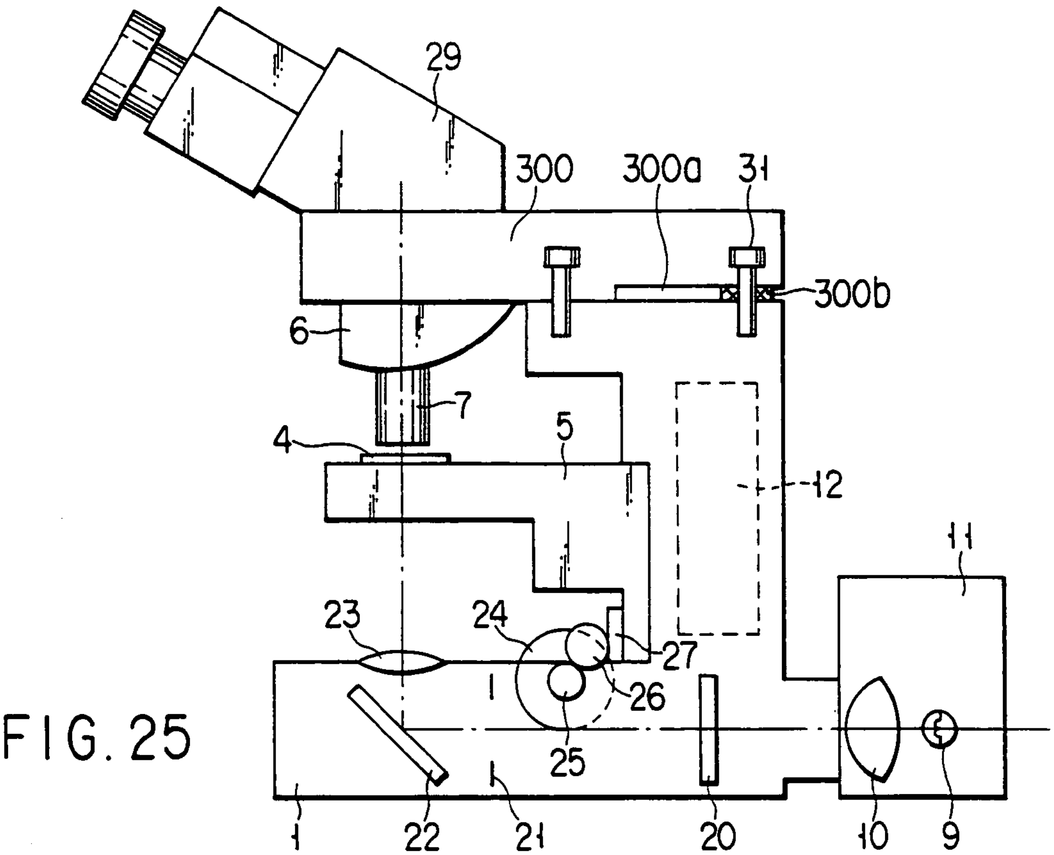
FIG. 25 shows the structure of a transmitted-light type microscope according to an eighth embodiment of the present invention.

FIG. 25 shows the structure of a transmitted-light type microscope. In the figure, the same parts are given the same numerals as in FIG. 21, and detailed descriptions of these parts are omitted.

In the microscope, two fastening members 31 are used to fasten a frame 200 and an arm 300 together. The arm 300 is provided with a clearance 300*a* around the rear fastening member. The frame 200 and the arm 300 are fastened together with a spacer 300*b* in between to enclose the fastening members 31 with material which has a higher coefficient of thermal expansion than the arm 300.

The clearance 300*a* may be provided on the side of the frame 200, not on the side of the arm 300. If the clearance 300*a* is provided on the side of the frame, the spacer 300*b* should be made of material with a higher coefficient of thermal conductivity, compared with the arm 300 (e.g., magnesium).

The operation of a microscope with such a structure is described below.

During transmitted-light observation of the specimen 4, light emitted from the lamp housing 11 is concentrated through the transmitted-light optical system on the specimen 4.

Figure 26:
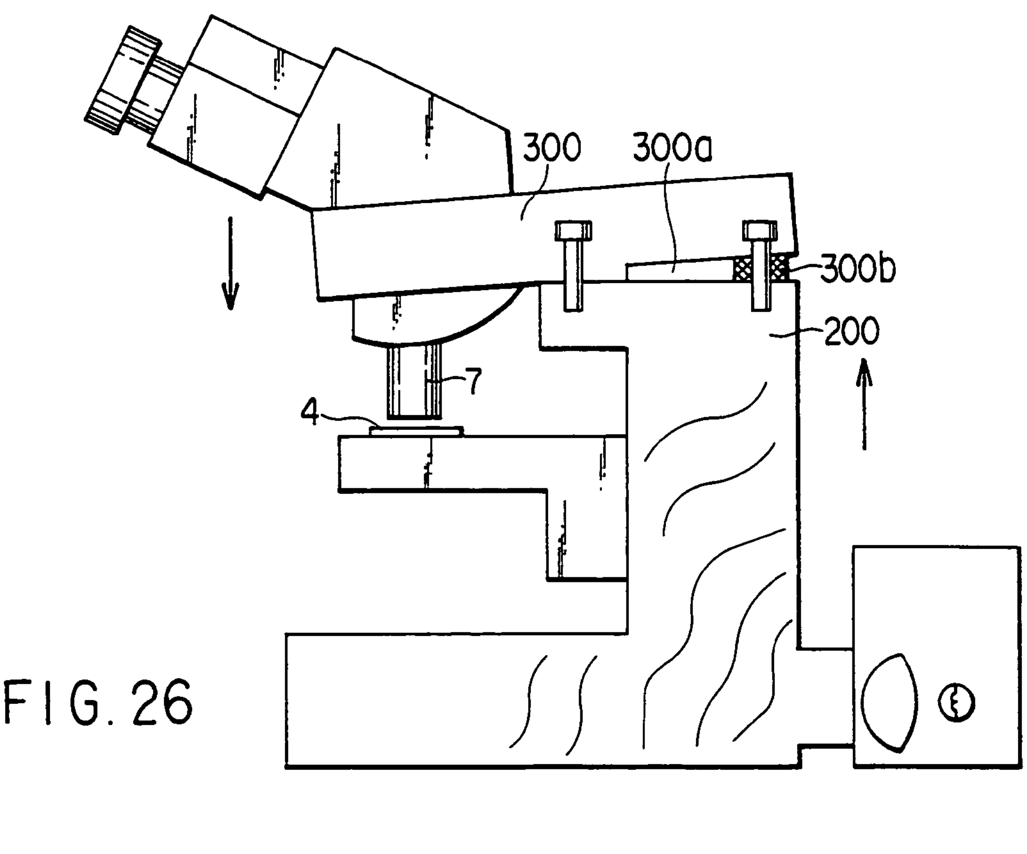
FIG. 26 illustrates heat conduction to a frame and an arm of the microscope.

Heat generated from the lamp 9 while it is lit is conducted from the base 1 to the frame 200 as shown in FIG. 26, so that the fame 200 expands upward. The objective lens 7 moves up away from the specimen 4 due to elongation of the frame 200.

Heat transfers not only to the arm 300 but to the spacer 300*b*, so that the arm and spacer expand. Because the spacer 300*b* has a higher coefficient of thermal expansion than the arm, the arm 300 bows as shown in the figure, thereby causing the objective lens 7 side of the arm 300 to move down. That is, the objective lens 7 moves down.

Downward displacement of the objective lens 7 due to deformation of the arm 300 occurs in such a direction that the displacement of the object lens cancels the above-mentioned upward displacement of the objective lens 7 due to elongation of the frame 200. Accordingly, a focal point shift due to thermal expansion can be reduced.

The eighth embodiment provides an easier, more inexpensive microscope arrangement than the seventh embodiment.

Figure 27A:
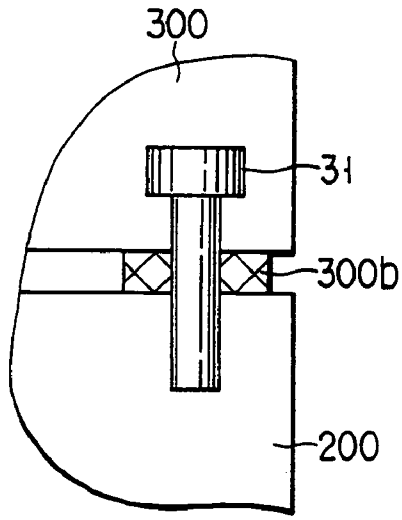
FIGS. 27A and 27B illustrate a fastener for a frame and an arm of the microscope.
Figure 27B:
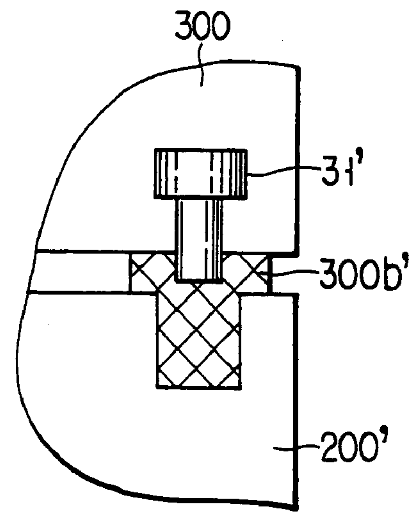

FIG. 27A is an enlarged view of a fastening member 31 and its surroundings. If the fastening members 31 differ in coefficient of thermal expansion from the spacer 300*b*, thereby preventing the spacer 300*b* from expanding, the above-described effect cannot probably be obtained. In such a case, if a spacer 300*b*' which has a higher coefficient of thermal expansion than an arm 200' is secured as a fastening member to the frame 300, and the arm 300 is secured to the spacer 300*b*' using the fastening members 31, as shown in FIG. 27B, the same effect described above can be obtained.

<Modification 1>

Figure 28:
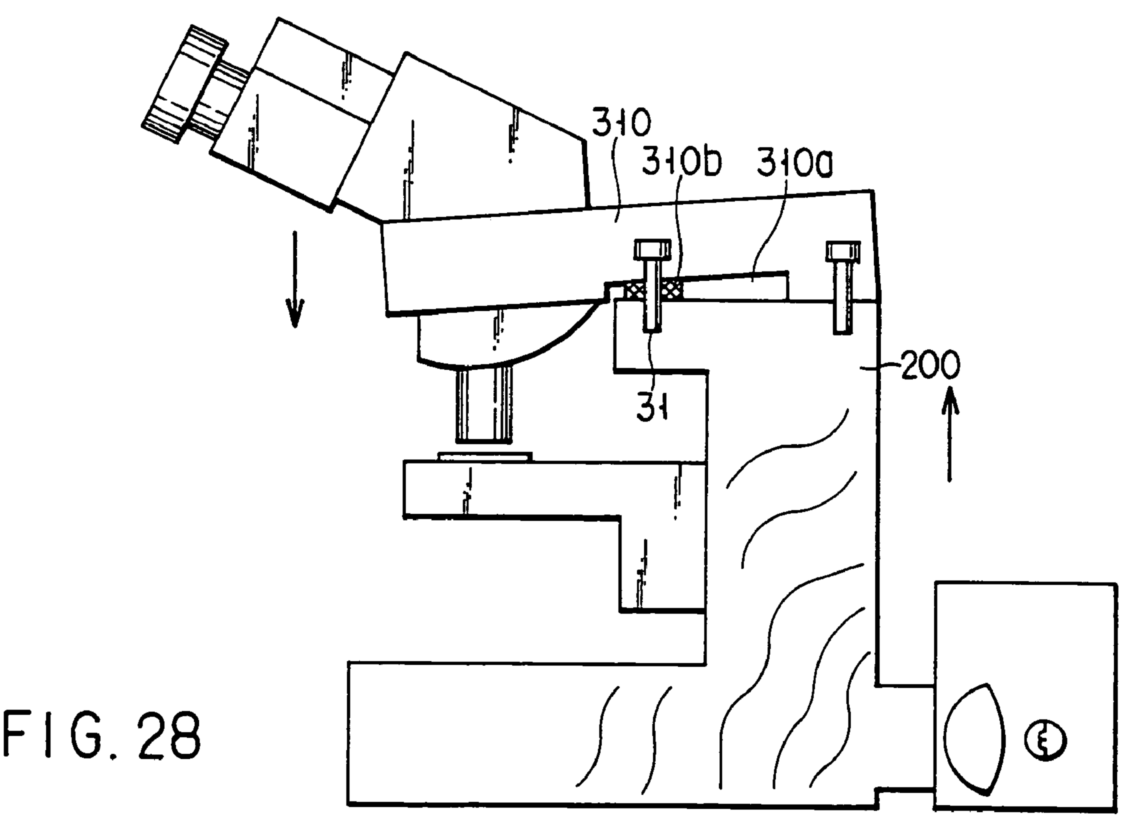
FIG. 28 shows the structure of a modification of the microscope.

As shown in FIG. 28, the two fastening members 31 are used to fasten a frame 310 and the arm 200 together. The arm 310 is provided with a clearance 310*a* around the front fastening member. The frame 200 and the arm 310 are fastened together with a spacer 310*b* in between to enclose the fastening members 31 with material which has a lower coefficient of thermal expansion than the arm 310 (e.g., ceramic). Such an arrangement also provides the same effect as described above.

Figure 29:
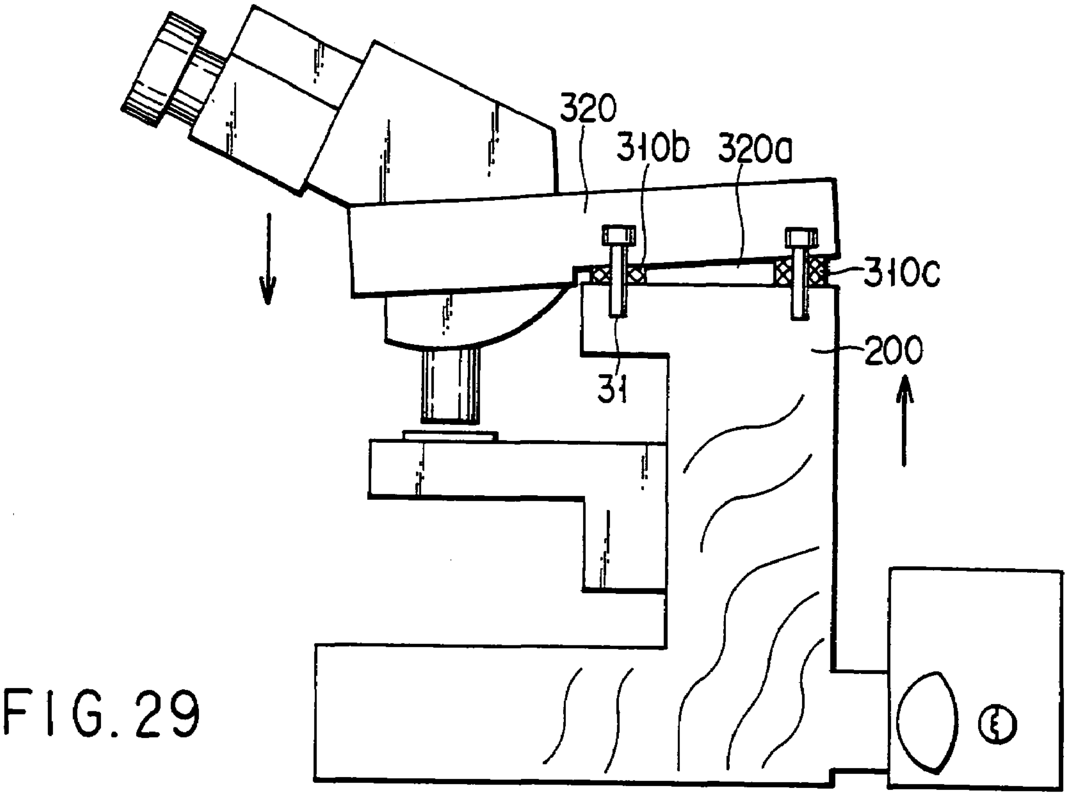
FIG. 29 shows the structure of another modification of the microscope.

As shown in FIG. 29, an arm 320 is provided with a clearance 320*a*, and the two fastening members 31 are placed through spacers 310*b* and 310*c*. The rear spacer 310*c* is made of material which has a higher coefficient of thermal expansion (e.g., magnesium) than material for the rear spacer 310*c* (e.g., ceramic). Such an arrangement also provides the same effect as described above.

<Modification 2>

Figure 30:
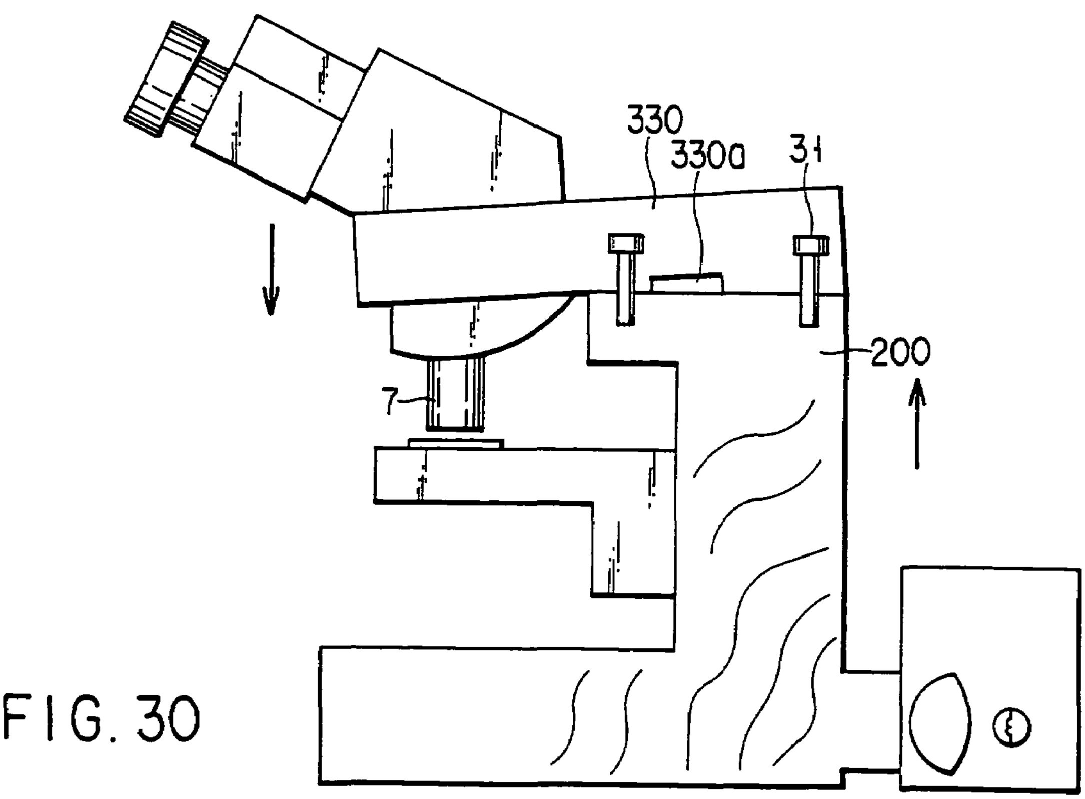
FIG. 30 shows the structure of a still another modification of the microscope.

As shown in FIG. 30, a clearance 330*a* may be provided so that the area of front contact between a frame 14 and an arm 217 is larger than that of rear contact between these two assemblies. This arrangement allows heat to more easily transfer from the frame 200 to the rear of an arm 330, so that the rear of the arm 217 further expands. Accordingly, the arm 330 bows to cancel displacement of the objective lens 20 due to deformation of the frame 200.

The eighth embodiment makes it possible to reduce an image blur at a low cost without weakening a stage or deteriorating castability and machinability.

Further, the various structures described by reference to FIG. 13 to FIG. 30 is adaptable to the case of the reflected-light type microscope shown in FIG. 11.

As describe above in detail, the present invention provides a microscope which reduces an image blur caused by microscope body deformation due to heat, thereby producing a good specimen image.

The present invention also provides a microscope which reduces an image blur caused by thermal deformation of a metal plate for securing a power supply to a microscope body, thereby producing a good specimen image.

The present invention also provides a microscope which reduces an image blur at a low cost without weakening a stage or deteriorating castability and machinability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:

a frame which supports a stage that is adapted to have a specimen placed thereon;

an arm provided on the frame to support an objective lens;

an observation optical system provided on the arm;

an illumination optical system which includes a light source for illuminating the specimen and which is integrated with the frame;

a fastening mechanism which fastens the arm and the frame together via at least one spacer, said at least one spacer being provided between the arm and the frame and having a coefficient of thermal expansion that is different from a coefficient of thermal expansion of the arm;

wherein when a temperature of the frame rises due to operation of the light source, the objective lens is moved toward the stage due to the difference in coefficients of thermal expansion between said at least one spacer and the arm.

2. The microscope according to claim 1, wherein the fastening mechanism comprises a first fastening member at a first position and a second fastening member at a second position that is farther from the objective lens than the first position;

wherein the second fastening member fastens the arm to the frame via one said spacer, said spacer having a higher coefficient of thermal expansion than the arm.

3. The microscope according to claim 2, wherein the arm is made of a material including aluminum alloy and the spacer is made of a material including magnesium.

4. The microscope according to claim 1, the fastening mechanism comprises a first fastening member at a first position and a second fastening member at a second position that is farther from the objective lens than the first position;

wherein the first fastening member fastens the arm to the frame via one said spacer, said spacer having a lower coefficient of thermal expansion than the arm.

5. The microscope according to claim 4, wherein the arm is made of a material including aluminum alloy and the spacer is made of a material including ceramic.

6. The microscope according to claim 1, wherein the fastening mechanism comprises a first fastening member at a first position and a second fastening member at a second position that is farther from the objective lens than the first position;

wherein said at least one spacer comprises a first spacer and a second spacer;

wherein the first fastening member fastens the arm to the frame via said first spacer, and said first spacer has a lower coefficient of thermal expansion than the arm; and wherein the second fastening member fastens the arm to the frame via said second spacer, and said second spacer has a higher coefficient of thermal expansion than the arm.

7. The microscope according to claim 6, wherein said first spacer is made of a material including ceramic, and said second spacer is made of a material including magnesium.

8. The microscope according to claim 1, wherein the frame is made of a material including aluminum alloy.

* * * * *